(12) United States Patent
Wake et al.

(10) Patent No.: US 12,117,297 B2
(45) Date of Patent: Oct. 15, 2024

(54) TRAVELING ROUTE GENERATING SYSTEM, TRAVELING ROUTE GENERATING METHOD, TRAVELING ROUTE GENERATING PROGRAM, COORDINATE MEASURING SYSTEM, AND DRONE

(71) Applicant: NILEWORKS INC., Tokyo (JP)

(72) Inventors: Chihiro Wake, Tokyo (JP); Hiroshi Yanagishita, Tokyo (JP); Yutaka Murakumo, Tokyo (JP)

(73) Assignee: NILEWORKS INC., Tokyo (JP)

( * ) Notice: Subject to any disclaimer, the term of this patent is extended or adjusted under 35 U.S.C. 154(b) by 631 days.

(21) Appl. No.: 17/236,005

(22) Filed: Apr. 21, 2021

(65) Prior Publication Data
US 2021/0254980 A1    Aug. 19, 2021

Related U.S. Application Data

(63) Continuation of application No. PCT/JP2019/041134, filed on Oct. 18, 2019.

(30) Foreign Application Priority Data

Oct. 22, 2018    (JP) ................. 2018-198314

(51) Int. Cl.
*G01C 21/20* (2006.01)
*G05D 1/00* (2024.01)
*G08G 5/00* (2006.01)

(52) U.S. Cl.
CPC ............. *G01C 21/20* (2013.01); *G05D 1/101* (2013.01); *G08G 5/0047* (2013.01)

(58) Field of Classification Search
CPC .... G01C 21/20; G01C 15/02; G01C 21/3867; G05D 1/101; G08G 5/0047
See application file for complete search history.

(56) References Cited

U.S. PATENT DOCUMENTS 6,016,118 A * 1/2000 Jackson ............ G01S 19/50
                                                    342/357.29
6,094,625 A * 7/2000 Ralston ............ G01C 15/00
                                                    239/161
(Continued)

FOREIGN PATENT DOCUMENTS

CN     104808660 B  * 10/2017
JP     H08-22324 A     1/1996
(Continued)

OTHER PUBLICATIONS

"Radial Distance", 2014, https://psimpl.sourceforge.net/radial-distance.html, retrieved via Wayback machine (Year: 2014).*
(Continued)

*Primary Examiner* — Hussein Elchanti
*Assistant Examiner* — Kenneth M Dunne
(74) *Attorney, Agent, or Firm* — MATTINGLY & MALUR, PC

(57) ABSTRACT

There is provided a traveling route generating system for generating a traveling route for a movable device in a target area, the traveling route generating system includes: a target area information acquiring section that acquires sets of measurement-point coordinates on edges of the target area; and a movable area generating section that determines appropriateness of the sets of measurement-point coordinates, in a case where any of the plurality of sets of measurement-point coordinates is determined to be inappropriate by the determination, does not generate a movable area where the movable device can move or does not use a set of measurement-point coordinates determined to be inappropriate for generating the movable area, and in a case where the plurality of sets of measurement-point coordinates are determined to be appropriate by the determination,
(Continued)

generates the movable area based on the plurality of sets of measurement-point coordinates.

21 Claims, 19 Drawing Sheets

(56) References Cited

U.S. PATENT DOCUMENTS

| | | | | |
|---|---|---|---|---|
| 6,236,938 | B1* | 5/2001 | Atkinson | G09B 29/106 |
| | | | | 342/357.31 |
| 11,112,249 | B1* | 9/2021 | Jakusz | G01C 23/005 |
| 2010/0066603 | A1* | 3/2010 | O'Keefe | G01S 19/10 |
| | | | | 342/357.29 |
| 2012/0121206 | A1* | 5/2012 | Witmer | G06F 16/29 |
| | | | | 382/291 |
| 2012/0215410 | A1* | 8/2012 | McClure | G01C 15/00 |
| | | | | 701/50 |
| 2015/0193455 | A1* | 7/2015 | Koenig | G06Q 50/02 |
| | | | | 707/736 |
| 2015/0226575 | A1* | 8/2015 | Rambo | G01C 21/20 |
| | | | | 701/523 |
| 2016/0307447 | A1* | 10/2016 | Johnson | H04B 7/18506 |
| 2017/0219360 | A1* | 8/2017 | Cui | G01C 21/3815 |
| 2018/0100740 | A1* | 4/2018 | Seo | A01B 69/008 |
| 2019/0186913 | A1* | 6/2019 | Li | G01S 19/13 |
| 2019/0208695 | A1* | 7/2019 | Graf Plessen | A01B 69/007 |
| 2020/0033142 | A1* | 1/2020 | Flug | G01C 21/3867 |
| 2020/0218289 | A1* | 7/2020 | Gu | G05D 1/106 |

FOREIGN PATENT DOCUMENTS

| | | |
|---|---|---|
| JP | 2001-120151 A | 5/2001 |
| JP | 2006-113858 A | 4/2006 |
| JP | 2017-163265 A | 9/2017 |
| JP | 2017-204061 A | 11/2017 |
| JP | 2018-116614 A | 7/2018 |
| JP | 2018-117566 A | 8/2018 |
| JP | 2019-170197 A | 10/2019 |
| WO | 2016/002096 A1 | 1/2016 |
| WO | 2017/026080 A1 | 2/2017 |

OTHER PUBLICATIONS

Wikipedia, "Ramer-Douglas-Peucker algorithm", Apr. 2018, Wikipedia Foundation (Year: 2018).*

"Reumann-Witkam", 2014, http://psimpl.sourceforge.net/reumann-witkam.html, retrieved via waybackmachine (Year: 2014).*

Zhai et al., "Line Simplification Based On Geographic-Feature Constraint", 2009, Proceedings of the 24th International Cartographic Conference (Year: 2009).*

Machine translation of CN 104808660 B (Year: 2017).*

International Search Report of PCT/JP2019/041134 dated Dec. 17, 2019.

Chinese Office Action received in corresponding Chinese Application No. 201980069807.1 dated May 29, 2023.

Japanese Office Action received in corresponding Japanese Application No. 2020-511546 dated Apr. 15, 2021.

* cited by examiner

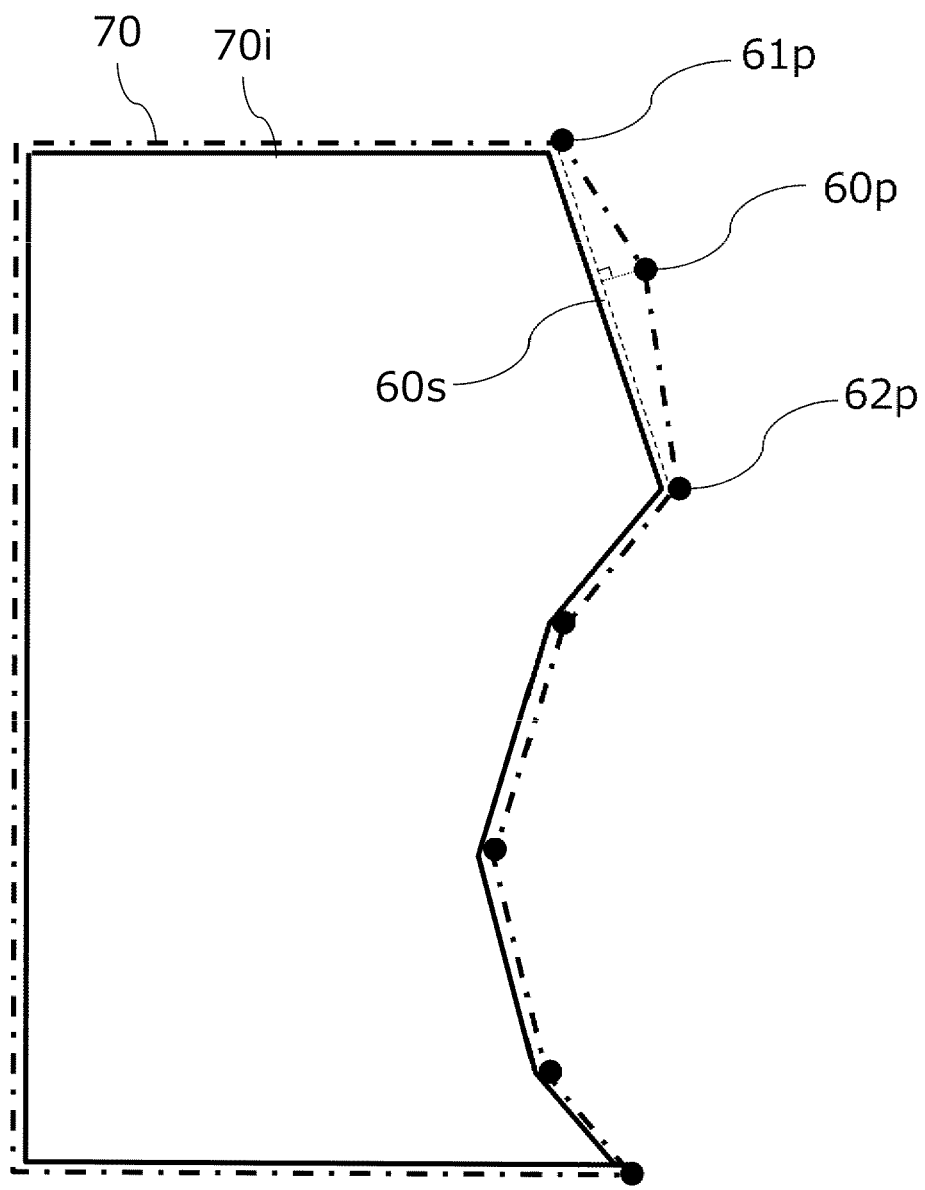

TRAVELING ROUTE GENERATING SYSTEM, TRAVELING ROUTE GENERATING METHOD, TRAVELING ROUTE GENERATING PROGRAM, COORDINATE MEASURING SYSTEM, AND DRONE

CROSS-REFERENCE TO RELATED APPLICATION

This application is a continuation application of PCT/JP2019/041134, filed on Oct. 18, 2019, which claims the benefit of priority of Japanese Patent Application No. 2018-198314, filed on Oct. 22, 2018, the entire contents of which are incorporated herein by reference.

TECHNICAL FIELD

The invention of the present application relates to a traveling route generating system, a traveling route generating method, a traveling route generating program, a coordinate measuring system, and a drone.

BACKGROUND ART

Application of a small helicopter (multicopter), which is generally called a drone, has progressed. One of important fields of the application is spreading a chemical agent, such as agrochemical and liquid fertilizer, over farmland (an agricultural field) (e.g., see Patent Literature 1). For relatively narrow farmland, using a drone is often suitable, instead of a piloted airplane or helicopter.

Thanks to a technology such as a quasi-zenith satellite system and a real time kinematic-global positioning system (RTK-GPS), it is possible to grasp an absolute position of a drone in flight accurately down to several centimeters, thereby enabling autonomous flight with a minimum of manual control and efficient, accurate spreading of a chemical agent even in farmland having a narrow, complicated terrain, which is typically seen in Japan.

On the other hand, as for autonomous flying drones for spreading an agricultural chemical agent, there are cases where consideration for their safety is somewhat insufficient. A drone equipped with a chemical agent weighs several tens of kilograms, and thus occurrence of an accident such as falling onto a person can cause a serious consequence. In addition, a drone is typically operated by an operator who is not an expert. it is therefore necessary to provide a foolproof scheme for drones; however, consideration of such a foolproof system has been insufficient. Hitherto, although there has been a technique for safety of a drone, which is presumably controlled by a human (e.g., see Patent Literature 2), there has been no technique for dealing with a safety issue specific to an autonomous flying drone for spreading an agricultural chemical agent.

In addition, there has been a need for a method for automatically generating a traveling route for a drone to perform autonomous flight. Patent Literature 3 discloses a traveling route production system that generates a round-trip traveling route for making a round trip in an agricultural field and a go-around traveling route for making a go-around along an outer-circumferential shape of the agricultural field. This system is assumed to be used for ground-traveling machinery such as planting machinery.

Patent Literature 4 discloses a traveling route production device that generates a route in a case where an outline of an agricultural field has a concave portion that is locally bent inward. Patent Literature 5 discloses an autonomous-traveling route generating system that generates a traveling route that detours around an obstacle present in a traveling region.

CITATION LIST

Patent Literature

Patent Literature 1: Japanese Patent Laid-Open No. 2001-120151
Patent Literature 2: Japanese Patent Laid-Open No. 2017-163265
Patent Literature 3: Japanese Patent Laid-Open No. 2018-117566
Patent Literature 4: Japanese Patent Laid-Open No. 2018-116614
Patent Literature 5: Japanese Patent Laid-Open No. 2017-204061

SUMMARY OF INVENTION

Technical Problem

An objective of the present invention is to provide a traveling route generating system generating a traveling route that allows an efficient movement and maintains a high safety even in autonomous operation.

Solution to Problem

A traveling route generating system according to an aspect of the present invention to achieve the objective described above is a traveling route generating system for generating a traveling route for a movable device in a target area, the traveling route generating system includes: a target area information acquiring section that acquires a plurality of sets of measurement-point coordinates on edges of the target area; and a movable area generating section that determines appropriateness of the plurality of sets of measurement-point coordinates, in a case where any of the plurality of sets of measurement-point coordinates is determined to be inappropriate by the determination, does not generate a movable area where the movable device can move or does not use a set of measurement-point coordinates determined to be inappropriate for generating the movable area, and in a case where the plurality of sets of measurement-point coordinates are determined to be appropriate by the determination, generates the movable area based on the plurality of sets of measurement-point coordinates.

In a case where any of the plurality of sets of measurement-point coordinates is determined to be inappropriate by the determination, the movable area generating section may use a user interface device to notify a user.

In a case where any of the plurality of sets of measurement-point coordinates is determined to be inappropriate by the determination, the movable area generating section may use a user interface device to notify a user of information on the set of measurement-point coordinates determined to be inappropriate.

Measurement-point coordinates acquired by the target area information acquiring section may be three-dimensional coordinates, and the movable area generating section may include a height abnormality checking section that, in a case where there is a set of measurement-point coordinates that makes an inclination of a straight line passing through two measurement points of the plurality of sets of measurement-point coordinates with respect to a horizontal plane not less than a predetermined value, determines that the set of measurement-point coordinates in question is inappropriate.

The movable area generating section may include a measurement order checking section that determines whether the plurality of sets of measurement-point coordinates are acquired in an order of neighborhood in a circumferential direction.

The measurement order checking section may define imaginary link segments that link the plurality of sets of measurement-point coordinates in an order of acquisition by the target area information acquiring section, check for presence or absence of an intersection at which some of the plurality of imaginary link segments intersect with each other on a horizontal plane, and determine, based on the presence or absence of the intersection, whether the plurality of sets of measurement-point coordinates are acquired in the order of neighborhood in the circumferential direction.

The movable area generating section may include a measurement-point integrating section that, in a case where there is a measurement point that is such close to a plurality of measurement points that distances between the measurement point and the plurality of measurement points are within a predetermined range on a horizontal plane or in a three-dimensional space, integrates the plurality of measurement points into one.

In a case where there is a measurement point that is such close to a plurality of measurement points that distances between the measurement point and the plurality of measurement points are within a predetermined range on a horizontal plane or in a three-dimensional space, the movable area generating section may exclude one or some of the plurality of measurement points close to one another to generate the movable area.

In a case where there is a measurement point that is such close to a plurality of measurement points that distances between the measurement point and the plurality of measurement points are within a predetermined range on a horizontal plane or in a three-dimensional space, the movable area generating section may determine coordinates being average values of the plurality of sets of measurement-point coordinates as an integrated measurement point and generate the movable area based on the integrated measurement point and other measurement points.

The movable area generating section may approximate a shape of a polygon of which endpoints are the plurality of measurement points to a polygon of which vertices are smaller in number than those of the polygon of which endpoints are the plurality of measurement points and determine the approximated polygon as the movable area.

The movable area generating section may further include a polygon approximation processing section that, in a case where a distance between an imaginary segment and any measurement point of the measurement points is less than a predetermined value, the imaginary segment linking first neighboring measurement-point coordinates and a second neighboring measurement point, the first neighboring measurement-point coordinates neighboring the any measurement-point in a circumferential direction, the second neighboring measurement point neighboring the any measurement point in a direction opposite to the circumferential direction, excludes the any measurement point from sets of endpoint coordinates of the movable area.

In a case where an angle formed by an imaginary segment linking the first neighboring measurement point and the any measurement point and an imaginary segment linking the second neighboring measurement point and the measurement point is greater than 180°, and in a case where, at the any measurement point, the distance between the imaginary segment linking the first neighboring measurement point and the second neighboring measurement point, and the any measurement point is less than a predetermined value, the polygon approximation processing section may determine the any measurement point as an approximation processing target point, define a polygonal approximation line that passes through the any measurement point and is parallel to the imaginary segment linking the first neighboring measurement point and the second neighboring measurement point, and set intersections between the polygonal approximation line and the link segments linking the plurality of sets of measurement-point coordinates as endpoint coordinates of the movable area.

In a case where one of the approximation processing target point is determined, the movable area generating section may sequentially determine whether a third neighboring measurement point is an approximation processing target point, the third neighboring measurement point further neighboring the first neighboring measurement point or the second neighboring measurement point in the circumferential direction, to determine one or more continuous approximation processing target points, and define a polygonal approximation line that passes through one of the one or more approximation processing target points farthest from a long imaginary segment and is parallel to the long imaginary segment, the long imaginary segment linking points that neighbor the one or more approximation processing target points and are different from the one or more approximation processing target points, and set intersections between the polygonal approximation line and link segments linking the plurality of measurement-point coordinates as endpoint coordinates of the movable area.

A drone according to another aspect of the present invention to achieve the objective described above flies within the movable area generated by the traveling route generating system according to any one of the above items.

The drone may be connected to the traveling route generating system over a network and be capable of receiving a traveling route generated in the movable area by the traveling route generating system and flying along the traveling route.

A coordinate measuring system according to another aspect of the present invention to achieve the objective described above is a coordinate measuring system including a base station and a coordinate measuring device, wherein the coordinate measuring device includes: a coordinate sensing section that acquires sets of measurement-point coordinates on edges of a target area based on a signal from the base station; and a movable area generating section that determines appropriateness of the sets of measurement-point coordinates, in a case where any of the plurality of sets of measurement-point coordinates is determined to be inappropriate by the determination, does not generate a movable area where the movable device can move or does not use a set of measurement-point coordinates determined to be inappropriate for generating the movable area, and in a case where the plurality of sets of measurement-point coordinates are determined to be appropriate by the determination, generates the movable area based on the plurality of sets of measurement-point coordinates.

A traveling route generating method according to still another aspect of the present invention to achieve the objective described above is a traveling route generating method for generating a traveling route for a movable device in a target area, the traveling route generating method includes: a step of acquiring sets of measurement-point coordinates on edges of the target area; and a step of determining appropriateness of the sets of measurement-point coordinates, in a case where any of the plurality of sets of measurement-point coordinates is determined to be inappropriate by the determination, not generating a movable area where the movable device can move or does not use a set of measurement-point coordinates determined to be inappropriate for generating the movable area, and in a case where the plurality of sets of measurement-point coordinates are determined to be appropriate by the determination, generating the movable area based on the plurality of sets of measurement-point coordinates.

A traveling route generating program according to still another aspect of the present invention to achieve the objective described above is a traveling route generating program for generating a traveling route for a movable device in a target area, the traveling route generating program causing a computer to execute: a command to acquire sets of measurement-point coordinates on edges of the target area; and a command to determine appropriateness of the sets of measurement-point coordinates, in a case where any of the plurality of sets of measurement-point coordinates is determined to be inappropriate by the determination, not to generate a movable area where the movable device can move or does not use a set of measurement-point coordinates determined to be inappropriate for generating the movable area, and in a case where the plurality of sets of measurement-point coordinates are determined to be appropriate by the determination, to generate the movable area based on the plurality of sets of measurement-point coordinates.

Note that the computer program can be provided by download over a network such as the Internet or may be provided being recorded in one of various kinds of computer-readable recording media such as a CD-ROM.

Advantageous Effect of Invention

The present invention makes it possible to generate a traveling route that allows an efficient movement and maintains a high safety even in autonomous operation.

BRIEF DESCRIPTION OF DRAWINGS

FIG. 10A is a schematic diagram illustrating imaginary link segments that link neighboring points in an order in which measurement points are measured in an order of neighborhood in a circumferential direction, and FIG. 10B is a schematic diagram illustrating imaginary link segments that link neighboring points in an order in which the measurement points are measured in an order different from the order of neighborhood in the circumferential direction.

FIG. 11 is a schematic diagram illustrating another example of an agricultural field for which the traveling route generating device generates a traveling route.

DESCRIPTION OF EMBODIMENTS

Embodiments for carrying out the invention of the present application will be described below with reference to the drawings. The drawings are all for exemplification purposes. In a detailed description to be made below, specific details will be described for explanation and for helping complete understanding of disclosed embodiments. However, embodiments are not limited to these specific details. In addition, well-known structures and devices are illustrated schematically for simplification of the drawings.

In the present specification, a drone generally refers to an aerial vehicle including a plurality of rotary wings irrespective of its type of motive power (electric motor, heat engine, etc.) and its type of control (wireless or wired, autonomous flight or manual control, etc.). A drone is an example of a movable device and is capable of receiving, when necessary, information about a traveling route that is generated by a traveling route generating device according to the invention of the present application and flying along the traveling route.

As illustrated in FIG. 1 to FIG. 5, rotary wings 101-1a, 101-1b, 101-2a, 101-2b, 101-3a, 101-3b, 101-4a, and 101-4b (also referred to as rotors) are means for causing a drone 100 to fly, and eight rotary wings (four sets of double-tier rotary wings) are provided, with consideration given to a balance of stability of flight, a size of an airframe, and battery consumption.

Figure 1:
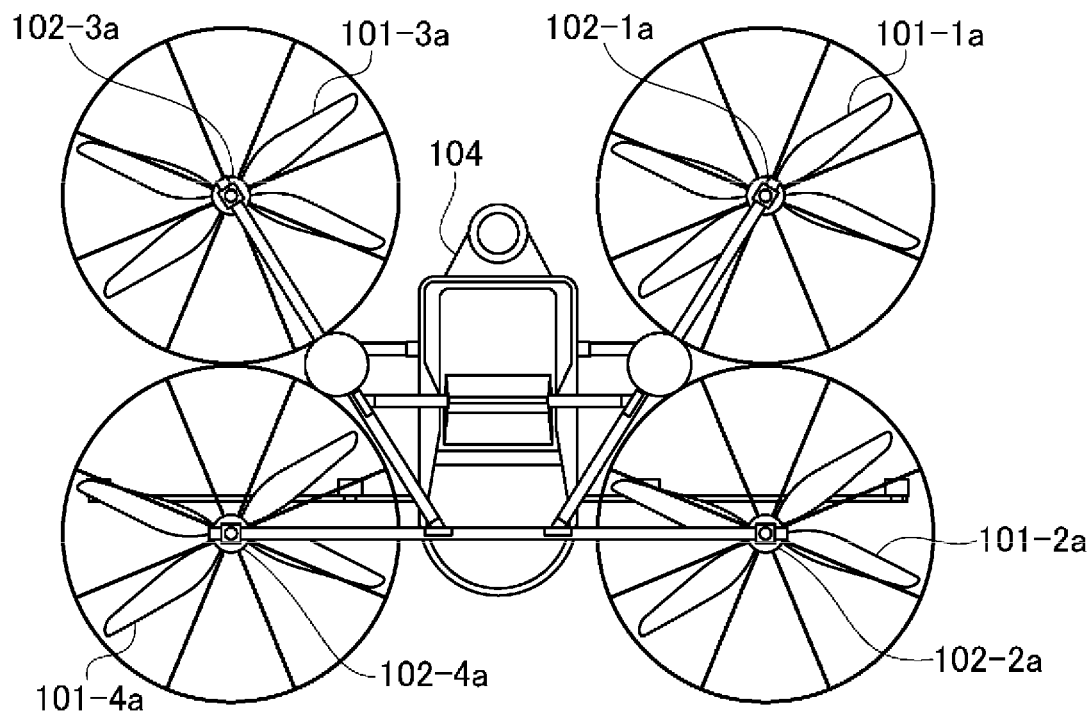
FIG. 1 is a plan view illustrating a first embodiment of a drone according to the invention of the present application.
Figure 2:
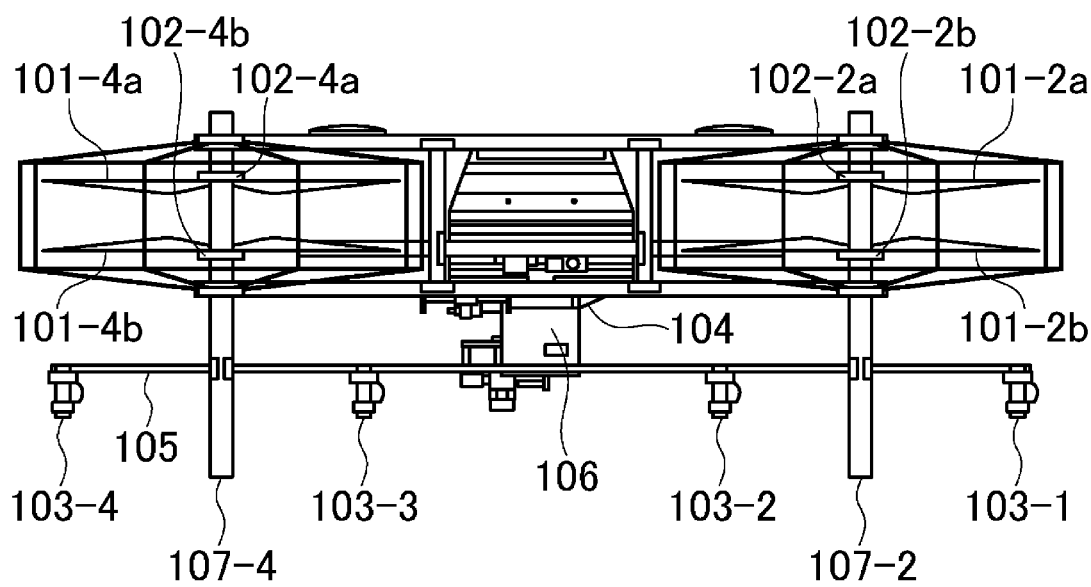
FIG. 2 is a front view of the drone.
Figure 3:
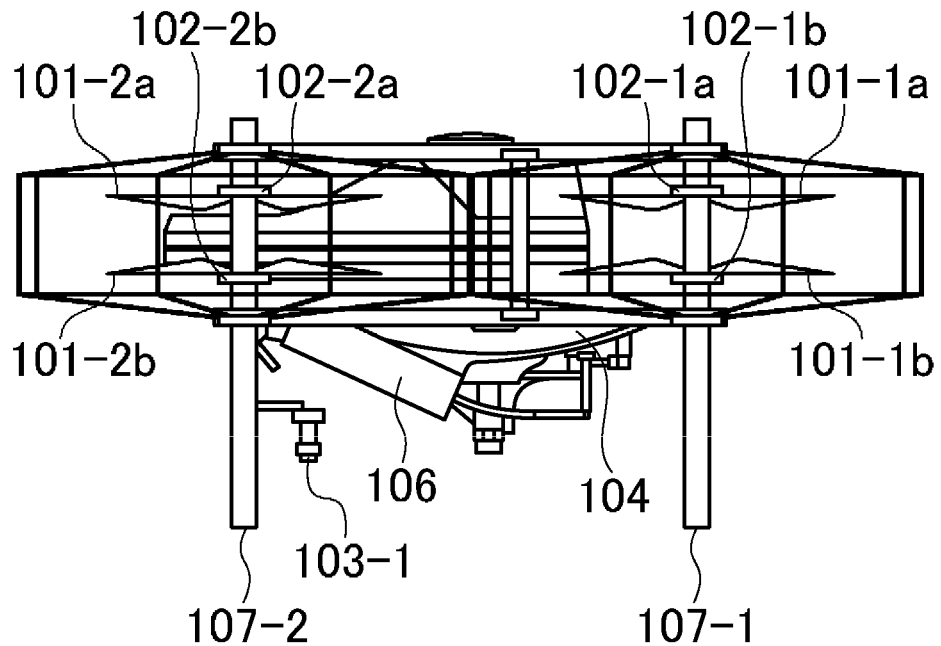
FIG. 3 is a right side view of the drone.
Figure 4:
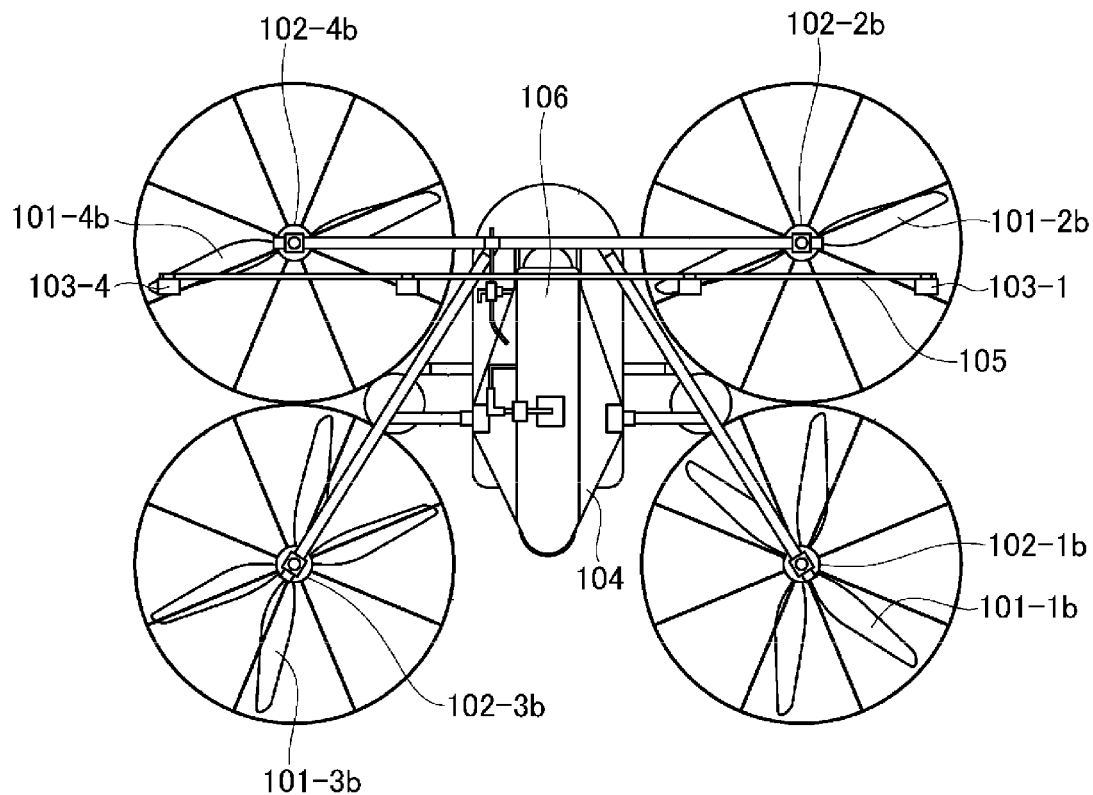
FIG. 4 is a rear view of the drone.
Figure 5:
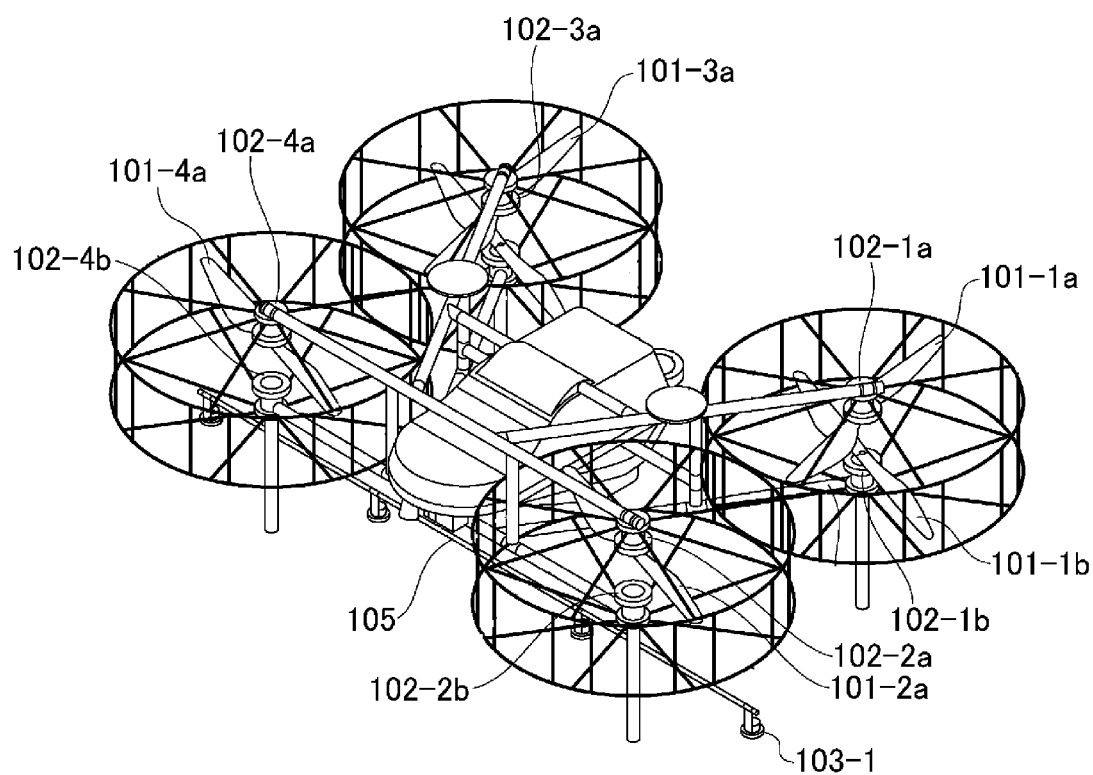
FIG. 5 is a perspective view of the drone.

Motors 102-1a, 102-1b, 102-2a, 102-2b, 102-3a, 102-3b, 102-4a, and 102-4b are means for causing the rotary wings 101-1a, 101-1b, 101-2a, 101-2b, 101-3a, 101-3b, 101-4a, and 101-4b to rotate (typically electric motors but may be engines, etc.), respectively, and are each provided for one rotary wing. The motors (102) are an example of thrusters. Up and down rotary wings of one of the sets (e.g., 101-1a and 101-1b) and their respective motors (e.g., 102-1a and 102-1b) include axes lying on the same straight line and rotate in directions opposite to each other for stability of flight and the like of the drone. Although some of the rotary wings and the motors, the rotary wing 101-3b and the motor 102-3b, are not illustrated, their positions are obvious and will be illustrated in a left side view if it is provided. As illustrated in FIG. 2 and FIG. 3, radial members for supporting propeller guards, which are provided to prevent the rotors from interfering with a foreign object, each have a turreted structure rather than a horizontal structure. This is because, in a case of a collision, this structure urges the member to buckle outward of the rotary wing, preventing the member from interfering with the rotor.

Chemical agent nozzles 103-1, 103-2, 103-3, and 103-4 are means for spreading the chemical agent downward, and the number of the chemical agent nozzles provided is four. Note that, in the present specification, a chemical agent generally refers to liquid or powder to be spread over an agricultural field, such as agrochemical, herbicide, liquid fertilizer, insecticide, seeds, and water.

A chemical agent tank 104 is a tank for storing a chemical agent to be spread and is provided at a position close to and below a center of gravity of the drone 100, from a viewpoint of weight balance. Chemical agent hoses 105-1, 105-2, 105-3, and 105-4 are means for connecting the chemical agent tank 104 and the chemical agent nozzles 103-1, 103-2, 103-3, and 103-4, are made of a hard material, and may additionally play a role of supporting the chemical agent nozzles. A pump 106 is means for discharging the chemical agent from the nozzles.

Figure 6:
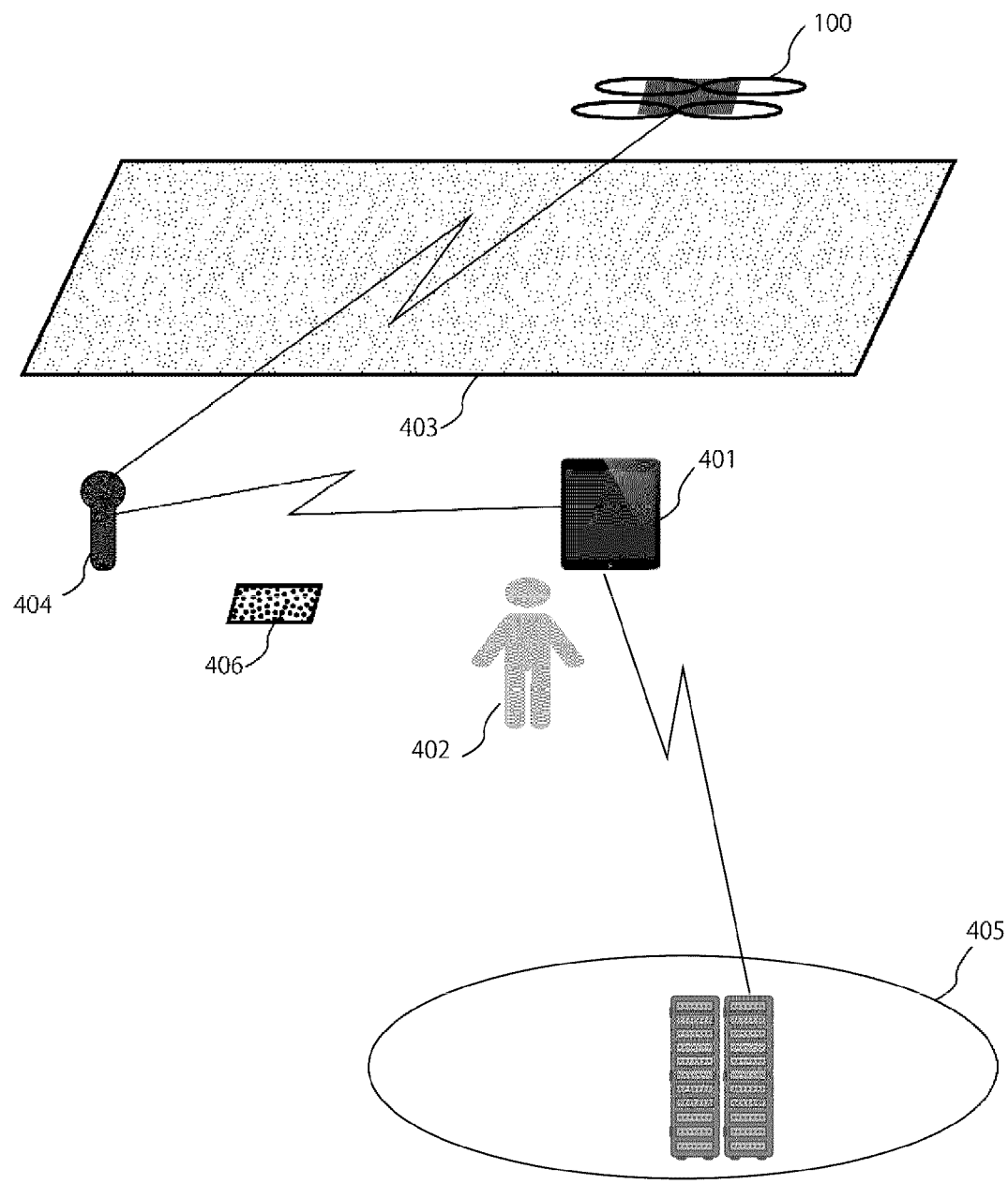
FIG. 6 is a general schematic diagram of a chemical-agent spreading system included in the drone.

FIG. 6 illustrates a general schematic diagram of a system to which an embodiment of the drone 100 according to the invention of the present application in chemical agent spreading use is applied. This figure is schematic, and its scale is not exact. An operating device 401 is means for sending a command to the drone 100 in response to an operation made by a user 402 and for displaying information received from the drone 100 (e.g., position, amount of chemical agent, remaining battery level, image taken by a camera, etc.) and may be implemented in a form of mobile information equipment such as a typical tablet terminal on which a computer program runs. The drone 100 according to the invention of the present application is controlled so as to perform autonomous flight and may be configured to allow manual operation in basic operations such as a takeoff and a return and in an emergency situation. In addition to the mobile information equipment, an emergency operating device (not illustrated) having a dedicated function of making an emergency stop may be used (the emergency operating device may be dedicated equipment provided with a large emergency stop button or the like for dealing speedily with an emergency situation). The operating device 401 and the drone 100 perform wireless communication with each other using Wi-Fi or the like.

An agricultural field 403 is a rice field, field, or the like that is to be spread with the chemical agent by the drone 100. In reality, topographic features of the agricultural field 403 are complex, and there may be no topographic map available, or a given topographic map may disagree with site conditions of the agricultural field 403. Usually, the agricultural field 403 is adjacent to a house, hospital, school, agricultural field of another crop, road, railroad, or the like. In the agricultural field 403, obstacles such as a building, an electric wire, or the like may be present.

A base station 404 is a device providing a master device function in Wi-Fi communication and the like and may be configured to function also as an RTK-GPS base station to provide an accurate position of the drone 100 (the master device function in the Wi-Fi communication and the RTK-GPS base station may be implemented in independent devices). An agriculture cloud 405 typically includes computers and relevant software operated on a cloud computing service and may be wirelessly connected to the operating device 401 with a mobile telephone line or the like. The agriculture cloud 405 may analyze images of the agricultural field 403 captured by the drone 100, grasp growth conditions of a crop, and perform processing for determining a flight route. In addition, the agriculture cloud 405 may provide topographic information and the like on the agricultural field 403 stored therein to the drone 100. Moreover, the agriculture cloud 405 may store flights of the drone 100 and images captured by the drone 100 and perform various kinds of analyses thereon.

In general, the drone 100 takes off from a takeoff-landing location 406 lying outside the agricultural field 403, spreads the chemical agent over the agricultural field 403, and returns to the takeoff-landing location 406 after the spreading or when replenishment of the chemical agent, electric recharging, or the like is needed. A flight route (entrance route) from the takeoff-landing location 406 to the agricultural field 403 as a destination may be stored in advance in the agriculture cloud 405 or the like or may be input by the user 402 before a takeoff.

Figure 7:
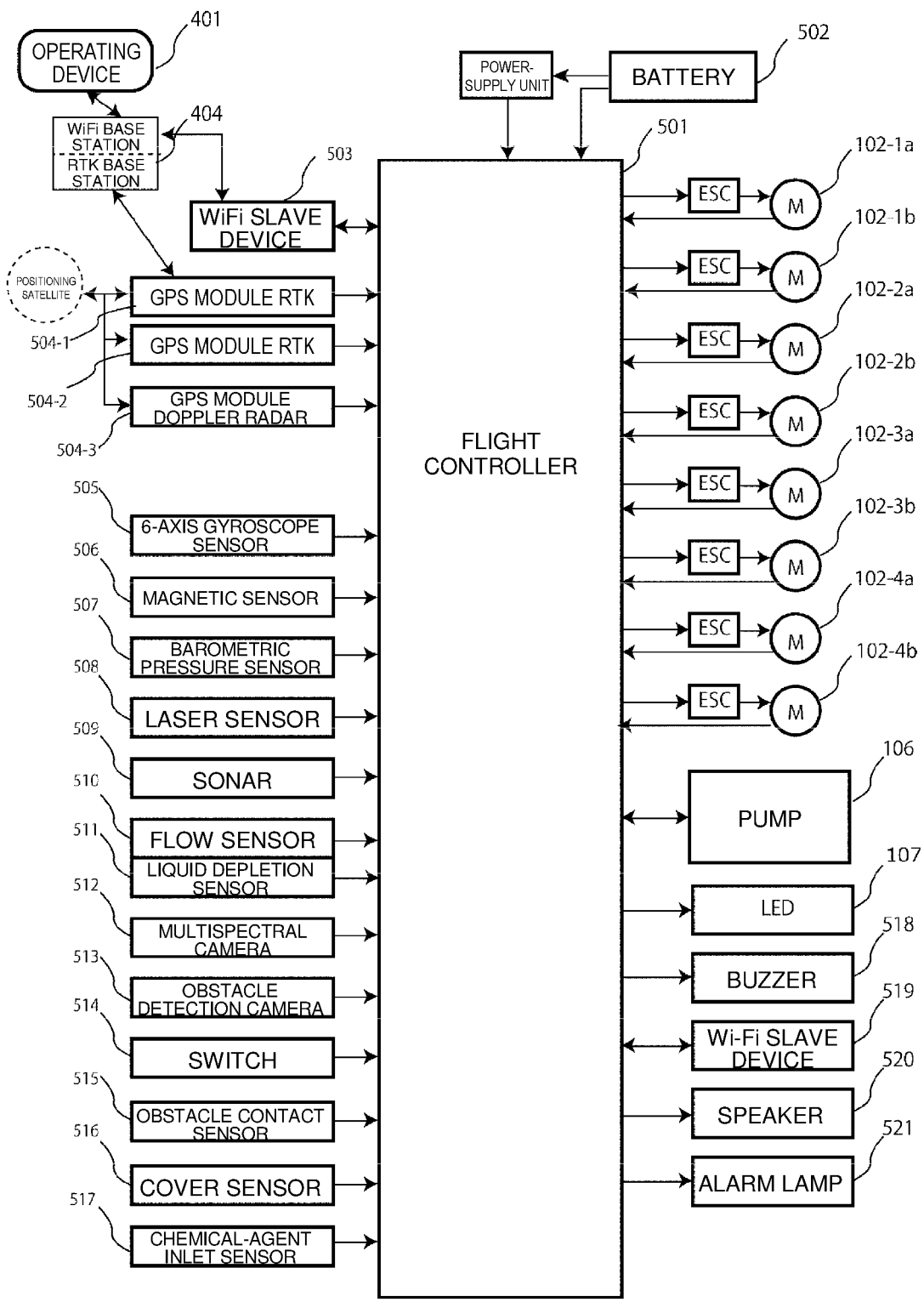
FIG. 7 is a schematic diagram illustrating control functions of the drone.

FIG. 7 is a block diagram illustrating control functions in an embodiment of a drone for spreading a chemical agent according to the invention of the present application. A flight controller 501 is a constituent component that governs control of the entire drone; specifically, the flight controller 501 may be an embedded computer including a CPU, a memory, relevant software, and the like. The flight controller 501 controls a flight of the drone 100 by controlling the numbers of revolutions of the motors 102-1a, 102-1b, 102-2a, 102-2b, 102-3a, 102-3b, 104-a, and 104-b via control units such as electronic speed controls (ESCs) based on input information received from the operating device 401 and input information obtained from various kinds of sensors described later. The flight controller 501 is configured to receive feedback on actual numbers of revolutions of the motors 102-1a, 102-1b, 102-2a, 102-2b, 102-3a, 102-3b, 104-a, and 104-b so as to monitor whether their rotations are normal. Alternatively, the flight controller 501 may be configured to receive feedback on the rotations of the rotary wings 101 from optical sensors or the like provided to the rotary wings 101.

Software used for the flight controller 501 can be rewritten for enhancement/modification of a function, fixing a problem, or the like via a storage medium or the like or communication means such as Wi-Fi communication and USB. In this case, the software is protected by encryption, checksum, digital signature, virus-check software, and the like so as not to be rewritten by fraudulent software. In addition, calculation processing used by the flight controller 501 for the control may be partly executed by the operating device 401 or another computer that is present on the agriculture cloud 405 or at another location. Some or all of the constituent components of the flight controller 501 may be duplexed owing to its great importance.

A battery 502 is means for supplying electricity to the flight controller 501 and other constituent components of the drone; the battery 502 may be rechargeable. The battery 502 is connected to the flight controller 501 via a power-supply unit including a fuse, a circuit breaker, or the like. The battery 502 may be a smart battery, which has a power-supply function as well as a function of transmitting its internal state (state of charge, integrated operating time, etc.) to the flight controller 501.

The flight controller 501 can receive a necessary command from the operating device 401 and send necessary information to the operating device 401 by exchanging data with the operating device 401 via a Wi-Fi slave device function 503 and additionally the base station 404. In this case, the communication may be encrypted to prevent fraudulent activities such as interception, spoofing, and hacking a device. The base station 404 has a communication function using Wi-Fi as well as a function of an RTK-GPS base station. Combining signals from the RTK base station and signals from GPS satellites, an absolute position of the drone 100 can be measured with a precision of about several centimeters by GPS modules 504. The GPS modules 504 may be duplexed/multiplexed owing to their great importance; in addition, the redundant GPS modules 504 may be controlled to use different satellites so as to prepare for failure of some GPS satellite.

A 6-axis gyroscope sensor 505 is means for measuring accelerations of the drone airframe in three directions orthogonal to one another (additionally, means for calculating velocities by integrating the accelerations). The 6-axis gyroscope sensor 505 is means for measuring changes in attitude angles, namely, angular velocities, of the drone airframe in the three directions described above. A geomagnetic sensor 506 is means for measuring a direction of the drone airframe by measuring the Earth's magnetic field. A barometric pressure sensor 507 is means for measuring barometric pressure; the barometric pressure sensor 507 can also measure an altitude of the drone indirectly. A laser sensor 508 is means for measuring a distance between the drone airframe and the Earth's surface by using reflection of laser light; the laser sensor 508 may use infrared (IR) laser. A sonar 509 is means for measuring a distance between the drone airframe and the Earth's surface by using reflection of a sound wave such as an ultrasonic wave. These sensors may be selected in accordance with a cost target and performance requirements of the drone. In addition, a gyroscope sensor (angular velocity sensor) for measuring an inclination of the airframe, an anemometer sensor for measuring a force of wind, and the like may be added. These sensors may be duplexed or multiplexed. In a case where there are a plurality of sensors provided for the same purpose, the flight controller 501 may use only one of the sensors, and if a failure occurs in the one sensor, another one of the sensors may be switched to and used as an alternative sensor. Alternatively, the plurality of sensors may be used simultaneously, and the flight controller 501 may be configured to deem that a failure occurs if measurement results from the sensors disagree.

Flow sensors 510 are means for measuring flow rates of the chemical agent and are provided at a plurality of locations on channels from the chemical agent tank 104 to the chemical agent nozzles 103. A liquid depletion sensor 511 is a sensor for sensing whether an amount of the chemical agent falls to or below a predetermined amount. A multispectral camera 512 is means for capturing the agricultural field 403 to acquire data to be used for image analysis. An obstacle detection camera 513 is a camera for detecting obstacles for the drone; the obstacle image characteristic is a device of a different kind from that of the multispectral camera 512 because its image properties and an orientation of its lens are different from those of the multispectral camera 512. A switch 514 is means with which the user 402 of the drone 100 makes various settings. An obstacle contact sensor 515 is a sensor for detecting that the drone 100, particularly a portion of its rotor or its propeller guard has come into contact with an obstacle such as an electric wire, a building, a human body, a tree, a bird, and another drone. A cover sensor 516 is a sensor for detecting that a cover of an operation panel or a cover for an internal maintenance of the drone 100 is in an open state. A chemical-agent inlet sensor 517 is a sensor for detecting that an inlet of the chemical agent tank 104 is in an open state. These sensors may be selected in accordance with a cost target and performance requirements of the drone and may be duplexed or multiplexed. In addition, a sensor may be provided in the base station 404, the operating device 401, or another location outside of the drone 100, and information read by the sensor may be sent to the drone. For example, an anemometer sensor may be provided in the base station 404, and information concerning a force and a direction of wind may be sent to the drone 100 via Wi-Fi communication.

The flight controller 501 sends a control signal to the pump 106 to adjust an amount of the chemical agent to be discharged or stop discharging the chemical agent. The flight controller 501 is configured to receive feedback on current conditions (e.g., the number of revolutions) of the pump 106.

An LED 107 is display means for notifying an operator of the drone of a state of the drone. In place of or in addition to the LED, display means such as a liquid crystal display may be used. A buzzer 518 is output means for indicating the state (particularly an error state) of the drone using an aural signal. The Wi-Fi slave device function 503 is an optional constituent component that communicates with an external computer or the like for example to transfer software, separately from the operating device 401. In place of or in addition to the Wi-Fi slave device function, other kinds of wireless communication means such as infrared communication, Bluetooth®, ZigBee® and NFC, or wired communication means such as USB connection may be used. A speaker 520 is output means for indicating the state (particularly an error state) of the drone using recorded human voice, synthesized voice, or the like. In some weather conditions, a visual display by the drone 100 during flight is difficult to see; in this case, using voice to transmit the state is effective. An alarm lamp 521 is display means such as a strobe light for indicating the state (particularly an error state) of the drone. These kinds of input/output means may be selected in accordance with a cost target and performance requirements of the drone and may be duplexed or multiplexed.

The drone 100 needs traveling routes for efficiently flying over agricultural fields having various shapes. That is, in a case where the drone 100 spreads a chemical agent over an inside an agricultural field or a case where the drone 100 monitors an agricultural field, the drone 100 has to fly over the agricultural field thoroughly. At this time, a consumption of the battery and a flight time can be reduced by causing the drone not to fly the same route as much as possible. In spreading a chemical agent, if the chemical agent is spread on the same route, a concentration of the chemical agent may be increased under the route. Hence, the traveling route generating device generates a traveling route that causes a movable device including the drone 100 to move efficiently based on coordinate information on an agricultural field.

Figure 8:
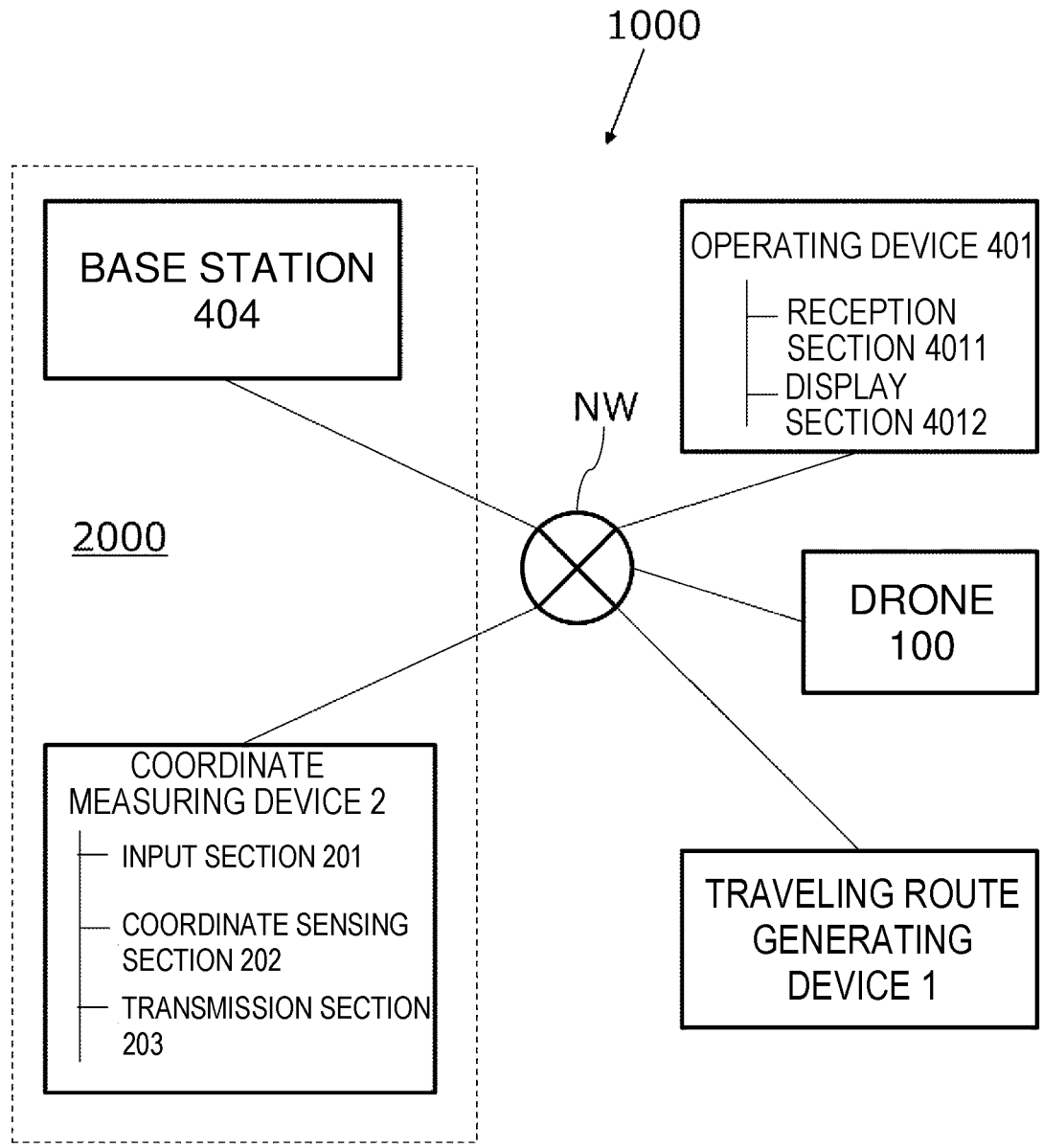
FIG. 8 is a general schematic diagram illustrating a traveling route generating system according to the invention of the present application, and is illustrating a traveling route generating device, a drone, a base station, an operating device, and a coordinate measuring device that are connected to one another over a network.

As illustrated in FIG. 8, a traveling route generating device 1, a coordinate measuring device 2, the base station 404, the operating device 401, and the drone 100 constitute a traveling route generating system 1000. The traveling route generating device 1, the drone 100, the base station 404, and the coordinate measuring device 2 are connected to one another over a network NW. Functions of the traveling route generating device 1 may be installed on the agriculture cloud 405 or may be installed in a separate device. The agricultural field is an example of a target area. The drone 100 is an example of the movable device. Alternatively, instead of the configuration in which the constituent components are connected to one another over the network NW, a configuration in which the drone 100 includes the traveling route generating device 1 may be adopted. Alternatively, a configuration in which the coordinate measuring device 2 includes the traveling route generating device 1 may be adopted. In particular, the coordinate measuring device 2 may include a coordinate appropriateness determining section 25 (see FIG. 9) to be described later. At least the coordinate measuring device 2 and the base station 404 constitute a coordinate measuring system 2000.

The coordinate measuring device 2 is a device having a function of an RTK-GPS mobile station and is capable of measuring an agricultural field to obtain coordinate information thereon. The coordinate measuring device 2 is a small device that a user can carry about, such as a rod-shaped device. The coordinate measuring device 2 may be a stick-shaped device that is long enough to allow a user in an upright posture to hold a top-end portion of the device while a bottom end of the device is in contact with the ground. The number of coordinate measuring devices 2 available to read coordinate information on an agricultural field may be one or more. A configuration in which one agricultural field can be measured to obtain coordinate information thereon by a plurality of coordinate measuring devices 2 enables a plurality of users to carry about the respective coordinate measuring devices 2 in the agricultural field, and thus measurement operation can be completed in a short time.

An altitude of the ground at the measurement point may be measured with, in place of RTK-GPS, an absolute altimeter additionally included in the coordinate measuring device 2, which emits a sound wave or an IR laser beam downward to measure a height of the ground. In the measurement with RTK-GPS, the height of the ground is measured based on a positional relationship between a plurality of satellites above the coordinate measuring device 2 and the coordinate measuring device 2. Since positions of the plurality of satellites always move, the height of the ground cannot be measured accurately only with the positional relationship between the plurality of satellites and the coordinate measuring device 2. For example, in a case where the plurality of satellites are positioned directly above the coordinate measuring device 2, it is difficult to measure the height of the ground accurately. Hence, for the height of the ground, another altimeter capable of measuring the height more accurately is preferably included.

In addition, the coordinate measuring device 2 is capable of measuring obstacles in or near an agricultural field to obtain information thereon. The obstacles include a wall, a slope, a utility pole, an electric wire, and the like that involves a risk of collision with the drone 100, and various kinds of objects that need not be spread with a chemical agent or monitored.

The coordinate measuring device 2 includes an input section 201, a coordinate sensing section 202, and a transmission section 203.

The input section 201 is provided at a top-end portion of the coordinate measuring device 2; for example, the input section 201 is a button that receives a press by a user. The user presses the button of the input section 201 when intending to measure coordinates of a bottom end of the coordinate measuring device 2.

The input section 201 is configured to distinguish, when inputting the information, whether the input information concerns coordinates of an outer circumference of an agricultural field or coordinates of an outer circumference of an obstacle. In addition, the input section 201 can input coordinates of an outer circumference of an obstacle in conjunction with a kind of the obstacle.

The coordinate sensing section 202 is a functional section capable of sensing three-dimensional coordinates of the bottom end of the coordinate measuring device 2 by communicating with the base station 404 when necessary. The three-dimensional coordinates are coordinates on an X axis and a Y axis perpendicular to each other on a horizontal plane and on a Z axis perpendicular to the horizontal plane.

The transmission section 203 is a functional section that sends, in response to an input to the input section 201, three-dimensional coordinates of the bottom end of the coordinate measuring device 2 at a time of the input, over the network NW to the operating device 401 or the traveling route generating device 1. The transmission section 203 sends the three-dimensional coordinates in an order of pointing.

In a process of reading coordinate information on an agricultural field, a user moves in the agricultural field, holding the coordinate measuring device 2. First, three-dimensional coordinates of the agricultural field are acquired. The user performs pointing with the input section 201 at endpoints or edges of the agricultural field. Next, the user performs pointing with the input section 201 at endpoints or edges of obstacles.

Sets of three-dimensional coordinates of the endpoints or edges of the agricultural field that are acquired by the pointing and sent are received by the traveling route generating device 1 while being subjected to distinction between three-dimensional coordinates of an outer circumference of the agricultural field and three-dimensional coordinates of an obstacle. In addition, the three-dimensional coordinates acquired by the pointing may be received by a reception section 4011 of the operating device 401 and displayed by a display section 4012 of the operating device 401. The operating device 401 may determine whether the received three-dimensional coordinates are appropriate as three-dimensional coordinates of the outer circumference of the agricultural field or the obstacles, and in a case where the determination is that remeasurement is needed, the operating device 401 may use the display section 4012 to prompt the user to perform the remeasurement. The display section 4012 is an example of a user interface device.

Figure 9:
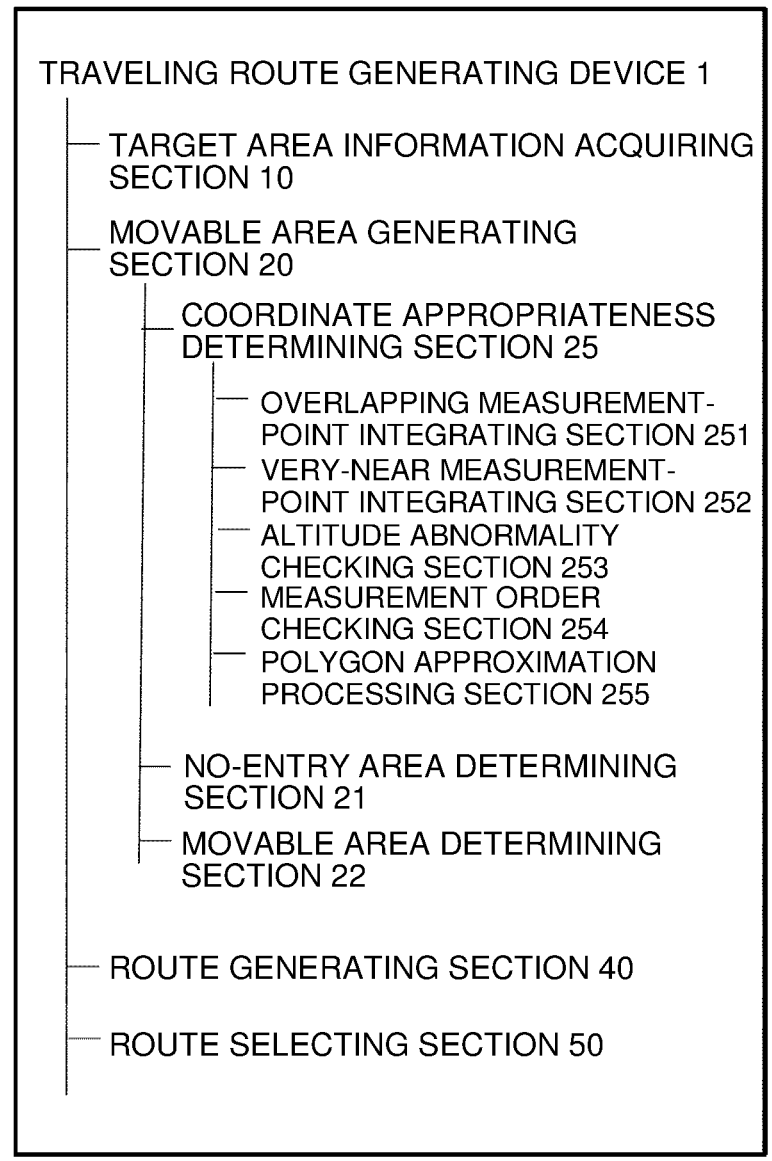
FIG. 9 is a functional block diagram of the traveling route generating device.

As illustrated in FIG. 9, the traveling route generating device 1 includes a target area information acquiring section 10, a movable area generating section 20, a route generating section 40, and a route selecting section 50.

The target area information acquiring section 10 is a functional section that acquires information on three-dimensional coordinates sent from the coordinate measuring device 2. The target area information acquiring section 10 acquires coordinate information acquired by the coordinate measuring device 2 together with an order of the acquisition by the coordinate measuring device 2.

Based on the three-dimensional coordinates acquired by the target area information acquiring section 10, the movable area generating section 20 generates a movable area 80*i* within which the drone 100 is to move in an agricultural field 80, as illustrated in FIG. 9. The movable area generating section 20 includes the coordinate appropriateness determining section 25, a no-entry area determining section 21, and a movable area determining section 22.

The coordinate appropriateness determining section 25 is a functional section that determines an appropriateness of a plurality of sets of measurement-point coordinates acquired by the target area information acquiring section 10 and, based on a result of the determination, extracts sets of endpoint coordinates of the movable area 80*i* where the drone 100 can fly safely. In a case where the determination is that any one of the acquired sets of measurement-point coordinates is inappropriate as a result of the determination, the coordinate appropriateness determining section 25 may limit generation of a movable area by the movable area determining section 22. Alternatively, in a case where the determination is that any one of the acquired sets of measurement-point coordinates is inappropriate, the coordinate appropriateness determining section 25 prohibits the movable area determining section 22 to use the one set of measurement-point coordinates to generate a movable area. Alternatively, the coordinate appropriateness determining section 25 may notify a user of information on the one set of measurement-point coordinates determined to be inappropriate via the user interface device.

Here will be described a configuration in which the coordinate appropriateness determining section 25 excludes a set of measurement-point coordinates determined to be inappropriate from generation of a movable area.

The coordinate appropriateness determining section 25 includes an overlapping measurement-point integrating section 251, a very-near measurement-point integrating section 252, an altitude abnormality checking section 253, a measurement order checking section 254, and a polygon approximation processing section 255. The overlapping measurement-point integrating section 251 and the very-near measurement-point integrating section 252 are examples of a measurement-point integrating section.

The overlapping measurement-point integrating section 251 is a functional section that determines whether there are overlapping sets of measurement-point coordinates on a horizontal plane or in a three-dimensional space, and in a case where there are overlapping sets of measurement-point coordinates, integrates the overlapping measurement points into one. For example, the overlapping measurement-point integrating section 251 excludes one or some of the overlapping measurement points. Alternatively, the overlapping measurement-point integrating section 251 may calculate average values of the plurality of sets of measurement-point coordinates and determine the average values as coordinates of a measurement point. With this configuration, a shape of the movable area 80*i* can be simplified, which enables a region where the drone 100 can fly safely to be determined appropriately.

The very-near measurement-point integrating section 252 is a functional section that determines whether a plurality of measurement points such close to one another that distances therebetween are within a predetermined range on a horizontal plane or in a three-dimensional space have been acquired and integrates the plurality of measurement points into one in a case where the measurement points are close to one another within the predetermined range. The predetermined range has, for example, dimensions that are sufficiently smaller than a spread width of the drone 100. For example, the very-near measurement-point integrating section 252 may exclude one or some of the overlapping measurement points or may calculate average values of the plurality of measurement-point coordinates and determine the average values as coordinates of a measurement point. The movable area determining section 22 to be described later generates a movable area based on the integrated measurement point and other measurement points.

The altitude abnormality checking section 253 is a functional section that determines presence or absence of a measurement point at which a result of measuring its altitude is abnormal, out of a plurality of measurement-point coordinates. An altitude coordinate is calculated using a function of the RTK-GPS mobile station included in the coordinate measuring device 2, but there is a case where an altitude coordinate is difficult to measure accurately due to a positional relationship between the coordinate measuring device 2 and satellites used by RTK-GPS. Hence, in a case where an altitude value of a measurement point significantly differs from those of other measurement points, the altitude abnormality checking section 253 does not perform processing using the measurement point in question but uses the user interface device to notify a user of being prompted to perform remeasurement.

The altitude abnormality checking section 253 calculates distances and differences of altitude between a plurality of measurement points. By dividing the differences of altitude by the distances, the altitude abnormality checking section 253 calculates degrees of inclinations, and if there is a measurement point having an inclination not less than a predetermined value, the altitude abnormality checking section 253 prompts for remeasurement of the measurement point. For example, in a case where there is a set of measurement-point coordinates that makes an inclination of a straight line passing through two measurement points of the plurality of sets of measurement-point coordinates with respect to a horizontal plane not less than a predetermined value, the altitude abnormality checking section 253 may determine that the set of measurement-point coordinates in question is inappropriate. Alternately, the altitude abnormality checking section 253 may calculate degrees of inclinations between a plurality of measurement points and prompt remeasurement for a measurement point that makes an inclination not less than the predetermined value with every other measurement point. In addition, the altitude abnormality checking section 253 may be configured to compare the plurality of measurement points with coordinate data on prior measurement and prompt remeasurement in a case where there is a difference from the coordinate data by a predetermined value or more. The altitude abnormality checking section 253 may refer to, for example, data illustrating terrains of the land published by authorities concerned such as the Geographical Survey Institute of Japan.

The determination of necessity of remeasurement from the result of measuring a height may be made by a user. In addition, in a case there is a measurement point that overlaps or is close to the measurement point in question in planar directions, the measurement point in question may be excluded from endpoints of the movable area 80$i$, and the measurement point overlapping or being close to the measurement point in question may be adopted as a possible endpoint of the movable area 80$i$.

The measurement order checking section 254 is a functional section that checks whether sets of coordinates of measurement points on a horizontal plane (X-Y plane) acquired by the target area information acquiring section 10 have been acquired in an order of neighborhood in a circumferential direction.

Figure 10A:
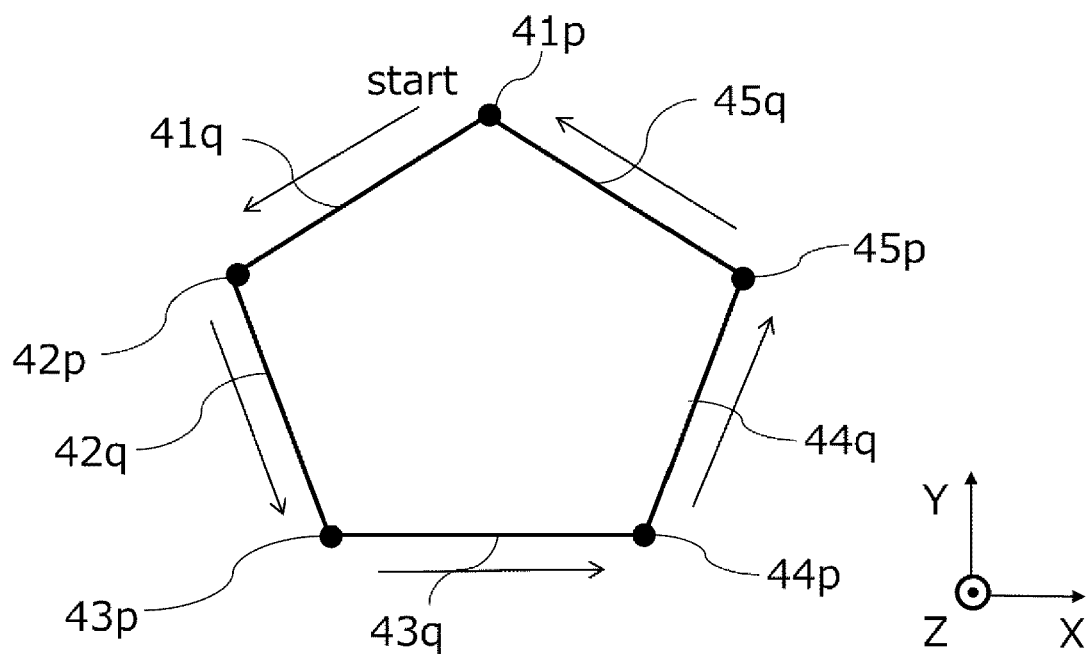
FIGS. 10A and 10B illustrate examples of agricultural fields for which the traveling route generating device generates a traveling route, where
Figure 10B:
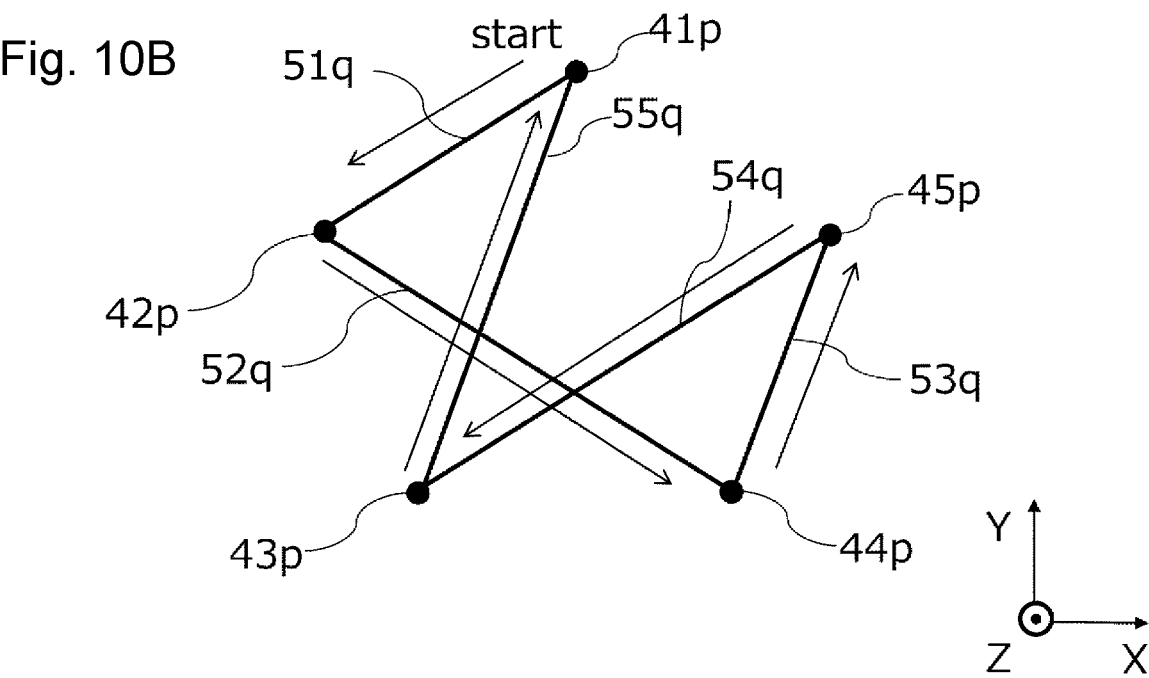

FIGS. 10A and 10B are diagrams illustrating positions of a plurality of measurement points on a horizontal plane (X-Y plane) in an agricultural field for which a traveling route is to be generated. As illustrated in FIG. 10A, in a case where sets of coordinates of measurement points 41$p$ to 45$p$ on a horizontal plane are acquired in an order of neighborhood in a circumferential direction, that is, the measurement points 41$p$ to 45$p$ are acquired in this order, imaginary link segments 41$q$ to 45$q$ defined as linking the measurement point 41$p$ to 45$p$ in an order of the acquisition form a polygon in which the imaginary link segments 41$q$ to 45$q$ do not intersect with one another. In contrast, as illustrated in FIG. 10B, in a case where the target area information acquiring section 10 acquires sets of measurement-point coordinates in an order of measurement points 41$p$, 42$p$, 44$p$, 45$p$, and 43$p$, imaginary link segments 51$q$ to 55$q$ defined as linking the measurement points 41$p$ to 45$p$ in an order of the acquisition have intersections on a horizontal plane because imaginary link segments 52$q$ and 54$q$ intersect with each other, and imaginary link segments 52$q$ and 55$q$ intersect with each other. In this manner, the measurement order checking section 254 checks for presence or absence of an intersection at which some of the imaginary link segments 51$q$ to 55$q$ intersect with each other on a horizontal plane, and in a case where there is no intersection, the measurement order checking section 254 determines that the sets of measurement-point coordinates have been acquired in an order of neighborhood in a circumferential direction. In a case where there is any intersection, the measurement order checking section 254 determines that the sets of measurement-point coordinates have not been acquired in the order of neighborhood in the circumferential direction and uses the user interface device to notify a user without performing processing using the measurement points in question. Specifically, the measurement order checking section 254 prompts the user to perform remeasurement.

The polygon approximation processing section 255 is a functional section that simplifies a shape of a region being a polygon of which endpoints are a plurality of sets of measurement-point coordinates into a shape with which the drone 100 can fly effectively. That is, the polygon approximation processing section 255 approximates a shape of the polygon to a polygon of which vertices are smaller in number than those of the polygon of which endpoints are the measurement points and determines the approximated polygon as a movable area.

The polygon approximation processing section 255 checks a shape of a triangle that is defined by linking a measurement point and its neighboring measurement points, and in a case where the triangle has a predetermined kind of shape with respect to an effective width of the drone 100, the polygon approximation processing section 255 excludes the triangle from a movable area. More specifically, assuming that a first neighboring measurement point neighbors any measurement-point coordinates in a circumferential direction, and a second neighboring measurement point neighbors the any measurement-point coordinates in a direction opposite to the circumferential direction, in a case where a distance between an imaginary segment linking the first neighboring measurement point and the second neighboring measurement point, and the any measurement-point coordinates is less than a predetermined value, the polygon approximation processing section 255 excludes the measurement point in question from sets of endpoint coordinates of the movable area. The effective width of the drone 100 is a width over which the drone 100 for spreading a chemical agent can spread the chemical agent through a movement in one direction. The effective width of the drone 100 is also a width over which the drone 100 flying for monitoring can perform the monitoring through a movement in one direction.

In a case where the distance between the imaginary segment linking the first neighboring measurement point and the second neighboring measurement point, and the any measurement-point coordinates is less than the effective width of the drone 100, the polygon approximation processing section 255 excludes the measurement point in question from sets of endpoint coordinates of the movable area. This is because it is difficult for the drone 100 to fly in a region narrower than the effective width without overlapping its flight region.

The polygon approximation processing section 255 performs different types of approximation processing between a measurement point at which an internal angle of a polygon defining an agricultural field 70 is greater than 180° and a measurement point at which the internal angle is less than 180°.

In the agricultural field 70 illustrated in FIG. 11, a measurement point 60$p$ is a point at which an internal angle is less than 180°. In addition, a distance between the measurement point 60$p$ and an imaginary segment 60$s$ that links a first neighboring point 61$p$ neighboring the measurement point 60$p$ in a circumferential direction and a second neighboring point 62$p$ neighboring the measurement point 60$p$ in a direction opposite to the circumferential direction is less than the effective width of the drone 100. At this time, the polygon approximation processing section 255 excludes the measurement point 60$p$ from endpoints of a movable area 70$i$. That is, the polygon approximation processing section 255 excludes a triangle defined by the measurement points 60$p$, 61$p$, and 62$p$ from the endpoints of a movable area 70$i$. The movable area 70$i$ generated in the agricultural field 70 is a region made by excluding the triangle defined by the measurement points 60$p$, 61$p$, and 62$p$ from the agricultural field 70.

For a measurement point at which an internal angle greater than 180°, the polygon approximation processing section 255 specifies an approximation processing target point, performs determination as to whether approximation processing is needed on measurement points neighboring the approximation processing target point in a circumferential direction one by one, and specifies an "approximation processing range", which is constituted by one or more measurement points disposed continuously in the circumferential direction. The polygon approximation processing section 255 performs the approximation processing collectively on the approximation processing range to simplify the shape of the movable area 70i.

Figure 12:
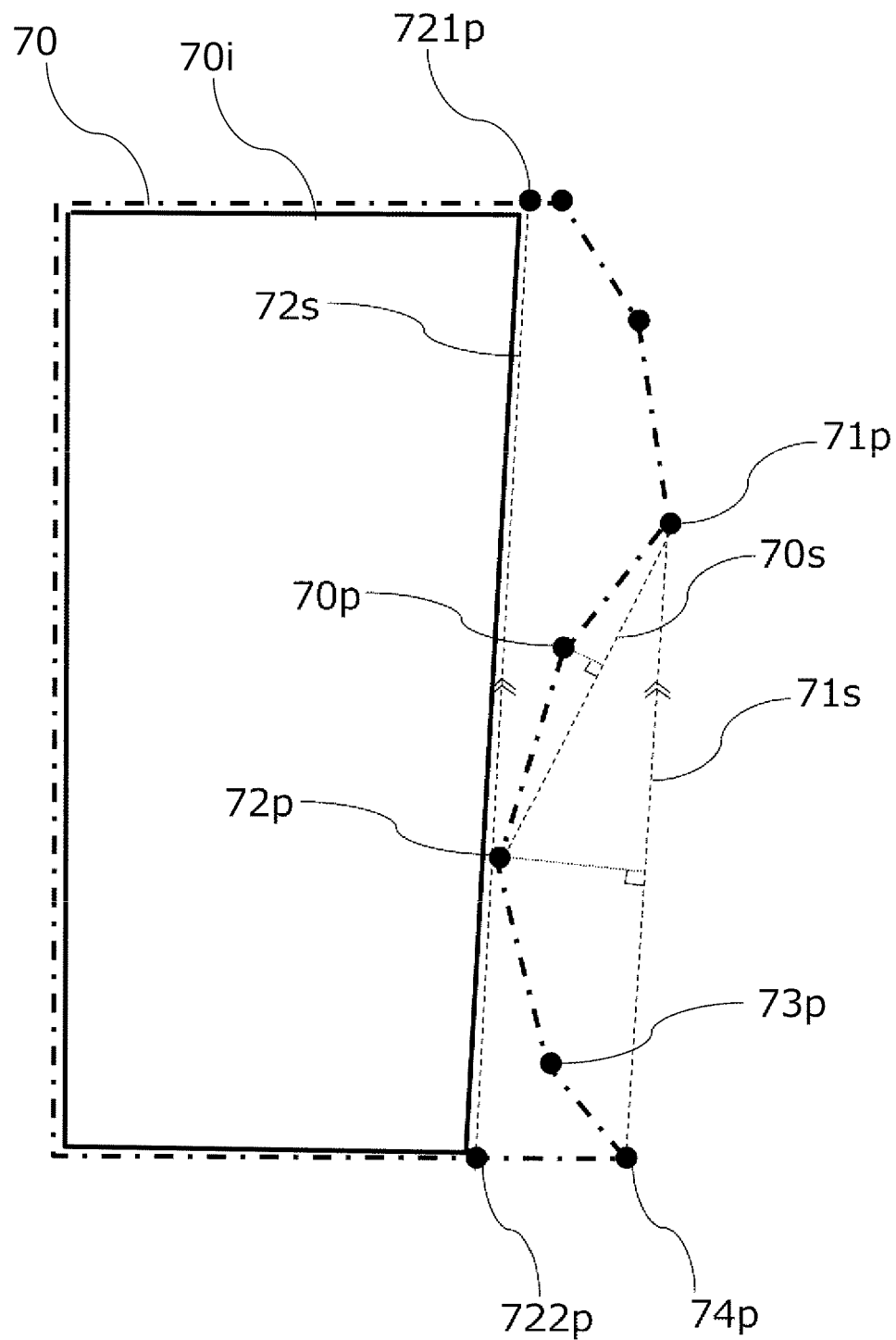
FIG. 12 is a schematic diagram illustrating how to perform a polygonal approximation process on an internal angle greater than 180° in the agricultural field.

In an agricultural field 70 illustrated in FIG. 12, there is a measurement point 70p at which an internal angle of a polygon defining the agricultural field 70 is greater than 180°. In a case where a distance between the measurement point 70p and an imaginary segment 70s that links a first neighboring point 71p neighboring the measurement point 70p in a circumferential direction and a second neighboring point 72p neighboring the measurement point 70p in a direction opposite to the circumferential direction is less than the effective width of the drone 100, the polygon approximation processing section 255 determines the measurement point 70p as an approximation processing target point. The polygon approximation processing section 255 sequentially performs determination as to whether requirements about an approximation processing target point are satisfied on the second neighboring point 72p, a third neighboring measurement point 73p neighboring the second neighboring point 72p in the direction opposite to the circumferential direction, and a measurement point 74p, to determine an approximation processing range. In this drawing, a start point and an end point of the approximation processing range are the first neighboring point 71p and the measurement point 74p, respectively.

The polygon approximation processing section 255 defines a long imaginary segment 71s that links the first neighboring point 71p and the measurement point 74p and calculates a point farthest from the long imaginary segment 71s out of approximation processing target points 70p to 74p. In this drawing, the farthest point is the second neighboring point 72p. The polygon approximation processing section 255 determines a polygonal approximation line 72s, which passes through the second neighboring point 72p and is parallel to the long imaginary segment 71s, as a new edge of the movable area 70i.

In other words, the polygon approximation processing section 255 determines intersections 721p and 722p between the long imaginary segment 71s and link segments that link the measurement points in the circumferential direction as new endpoints of the movable area 80i. In still other words, the approximation processing target points 70p to 74p are excluded from the endpoints of the movable area 70i.

Figure 21:
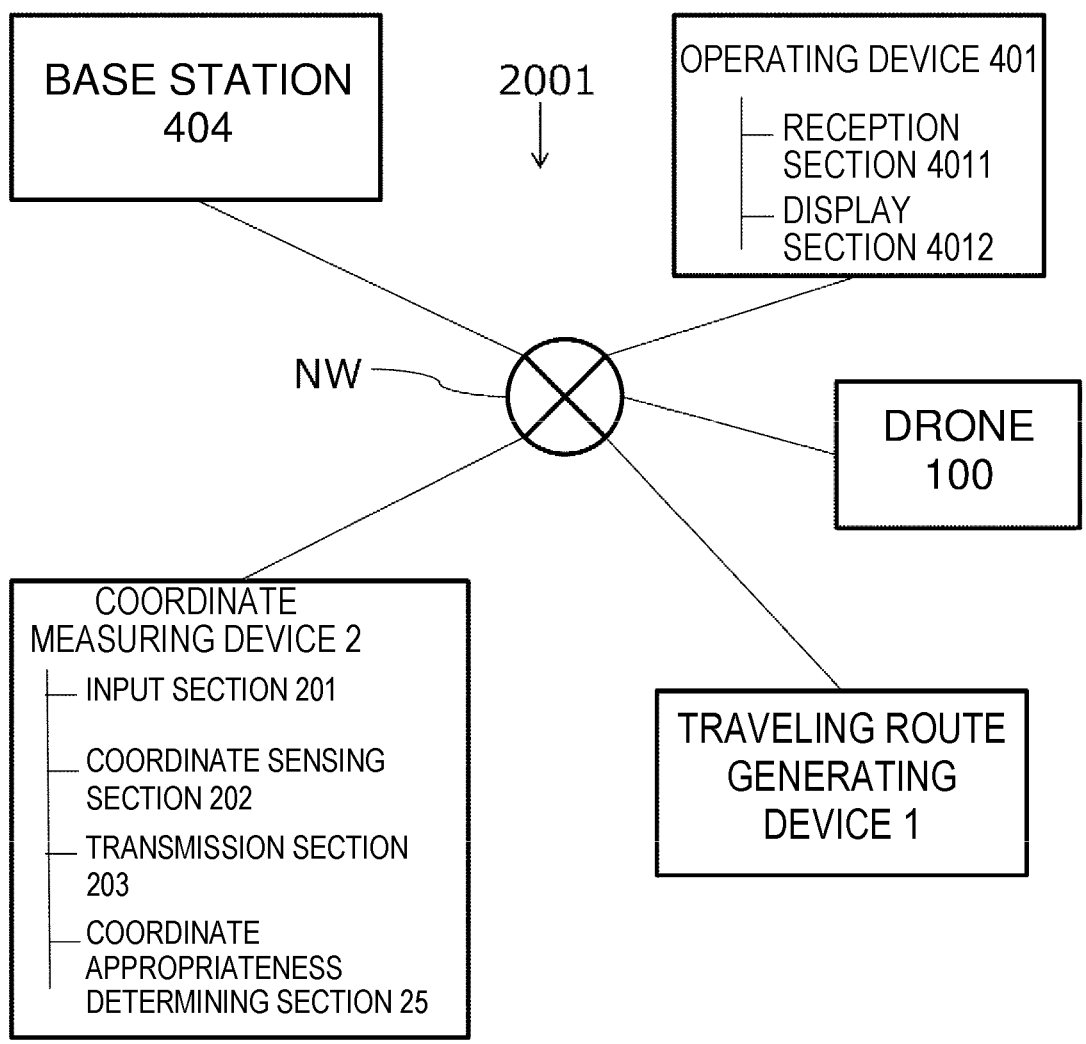
FIG. 21 is a general schematic diagram of a coordinate measuring system according to another embodiment of the present invention, illustrating a traveling route generating device, and a drone, a base station, an operating device, and a coordinate measuring device that are connected to one another over a network.

Note that, as illustrated in FIG. 21, the coordinate appropriateness determining section 25 may be included in the coordinate measuring device 2 in a coordinate measuring system 2001 according to another embodiment of the present invention. In this case, the transmission section 203 sends only coordinate information that is determined to be appropriate by the coordinate appropriateness determining section 25 to the traveling route generating device 1. With this configuration, appropriateness of coordinates can be determined without communication with the traveling route generating device 1, and thus appropriateness determination of the coordinates can be performed quickly.

Figure 13:
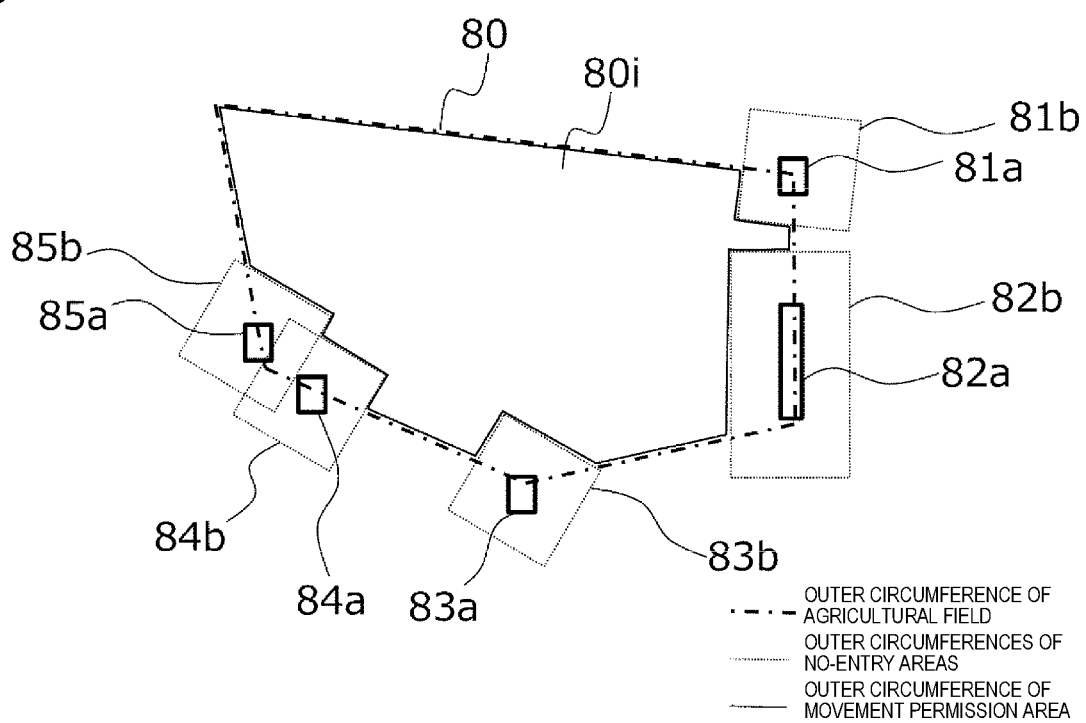
FIG. 13 is a schematic diagram illustrating another example of an agricultural field for which the traveling route generating device generates a traveling route, particularly illustrating no-entry areas.

The no-entry area determining section 21 illustrated in FIG. 9 is a functional section that determines no-entry areas 81b, 82b, 83b, 84b, and 85b for the drone 100 based on sets of three-dimensional coordinates and kinds of obstacles 81a, 82a, 83a, 84a, and 85a (see FIG. 13) acquired by the target area information acquiring section 10. The no-entry areas 81b to 85b are regions that include the obstacles 81a to 85a and areas surrounding the obstacles. The no-entry areas 81b to 85b are regions each defined in horizontal directions and a height direction and having an extent in three-dimensional directions; for example, the no-entry areas 81b to 85b are rectangular parallelepiped regions that are drawn centered about the obstacles 81a to 85a. Note that no-entry areas may be spherical regions that are drawn centered about obstacles. Since the drone 100 fly in the air, the drone 100 can fly over an obstacle if a height-direction size of the obstacle allows. A configuration that does not consider an area over an obstacle to be a no-entry area if a height-direction size of the obstacle makes it possible to fly in an agricultural field efficiently without detouring around the obstacle excessively.

Distances from outer edges of the obstacles to outer edges of the no-entry areas 81b to 85b are determined in accordance with kinds of the obstacles 81a to 85a. The distances from the outer edges of the obstacles to the outer edges of the no-entry areas 81b to 85b increase with an increase in danger that the obstacles pose in a case where the drone 100 collides with the obstacles. For example, a no-entry area of a house is within a range of 50 cm from an outer edge of the house; in contrast, a no-entry area of an electric wire is within a range of 80 cm from an outer edge of the electric wire. This is because a collision with an electric wire can cause a failure of the drone 100 as well as an incident such as a power transmission failure and a breakage of the electric wire, and thus an electric wire poses a greater danger in a case of collision. The no-entry area determining section 21 stores in advance an obstacle table in which kinds of obstacles and sizes of their no-entry areas are associated with each other; in accordance with a kind of an acquired obstacle, the no-entry area determining section 21 determines a size of its no-entry area.

The movable area determining section 22 is a functional section that extracts a region which the drone 100 can move from coordinate information on an agricultural field to determine the movable area 80i. A range of the movable area 80i is determined by excluding the no-entry areas 81b to 85b from a region surrounded by sets of endpoint coordinates determined by the coordinate appropriateness determining section 25. In particular, as for a height direction of the movable area 80i, the movable area determining section 22 determines a height-direction range of the movable area 80i by adding a height of a crop or a margin that ensures a safety in controlling flight to a height-direction coordinate acquired by the target area information acquiring section 10.

In a case where any of sets of measurement-point coordinates acquired by the coordinate appropriateness determining section 25 is determined to be inappropriate, the movable area determining section 22 may determine not to perform generation of a movable area.

The route generating section 40 illustrated in FIG. 9 is a functional section that generates a traveling route in a route generation target area in accordance with a route pattern. The route generating section 40 may be configured to generate a plurality of kinds of traveling routes in the route generation target area. The route selecting section 50 is capable of selecting which of traveling routes. A user may visually check the generated traveling routes to determine a traveling route.

In addition, the route selecting section 50 may be capable of receiving information on an order of priority from a user. For example, the user provides an input into the operating device 401 as to which of an operation time, a battery consumption of the drone 100, and a consumption of a chemical agent is to be assigned a first priority. In addition, the operating device 401 may be capable of receiving an index together that is to be assigned a second priority. Out of the plurality of traveling routes, the route selecting section 50 selects a traveling route that best matches the input order of priority. This configuration makes it possible to generate an efficient route that conforms to a user's plan.

Flowchart of Determining Appropriateness of Measurement-Point Coordinates by the Coordinate Appropriateness Determining Section 25

Figure 14:
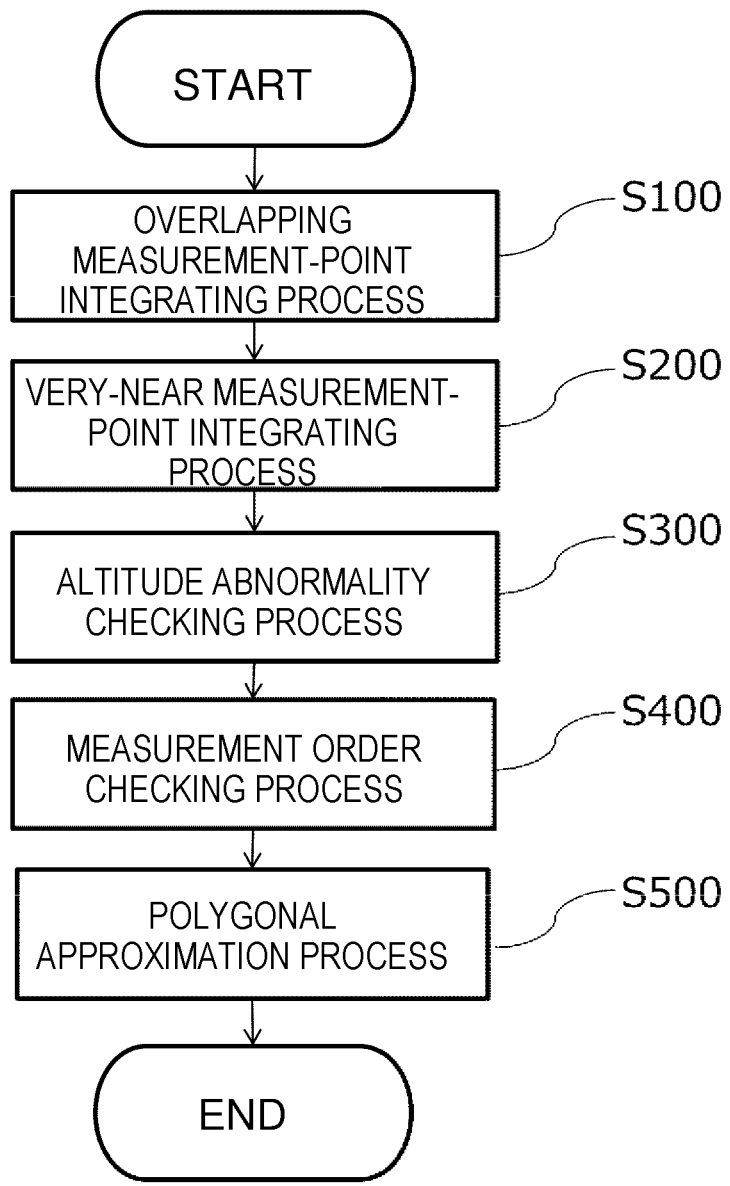
FIG. 14 is a flowchart illustrating processes through which a coordinate appropriateness determining section included in the traveling route generating device generates a movable area based on information on acquired measurement points.

A schematic flowchart of processing by the coordinate appropriateness determining section 25 will be described with reference to FIG. 14. Details of each step will be described later. As illustrated in the drawing, the coordinate appropriateness determining section 25 first uses the overlapping measurement-point integrating section 251 to determine and integrate overlapping measurement points (S100). The very-near measurement-point integrating section 252 determines and integrates measurement points close to one another (S200). The altitude abnormality checking section 253 determines presence or absence of a measurement point at which a result of measuring its altitude coordinate is abnormal (S300). If there is any measurement point at which a result of measuring its altitude coordinate is abnormal, the altitude abnormality checking section 253 uses a user interface device to issue an alarm prompting a user to perform remeasurement. Steps S100, S200, and S300 are executed in no particular order but may be executed simultaneously. Note that the coordinate appropriateness determining section 25 may be configured to first perform an altitude abnormality checking process S300, and, if there is any measurement point that overlaps or is close to a measurement point at which a result of measuring its altitude is abnormal, to adopt such a point of which an altitude is measured normally. With this configuration, remeasurement may be dispensed with even if a result of measuring an altitude coordinate is abnormal, which simplifies measurement operation.

Next, the measurement order checking section 254 checks whether sets of coordinates of measurement points acquired by the target area information acquiring section 10 have been acquired in an order of neighborhood in a circumferential direction (S400). For a plurality of sets of measurement-point coordinates, the polygon approximation processing section 255 checks a shape of a triangle that is defined by linking a measurement point and its neighboring measurement points, and in a case where the triangle has a predetermined kind of shape with respect to a movement width of the drone 100, the polygon approximation processing section 255 excludes the triangle from a movable area (S500).

Flowchart Illustrating Details of Step S100 Executed by the Overlapping Measurement-Point Integrating Section 251

Figure 15:
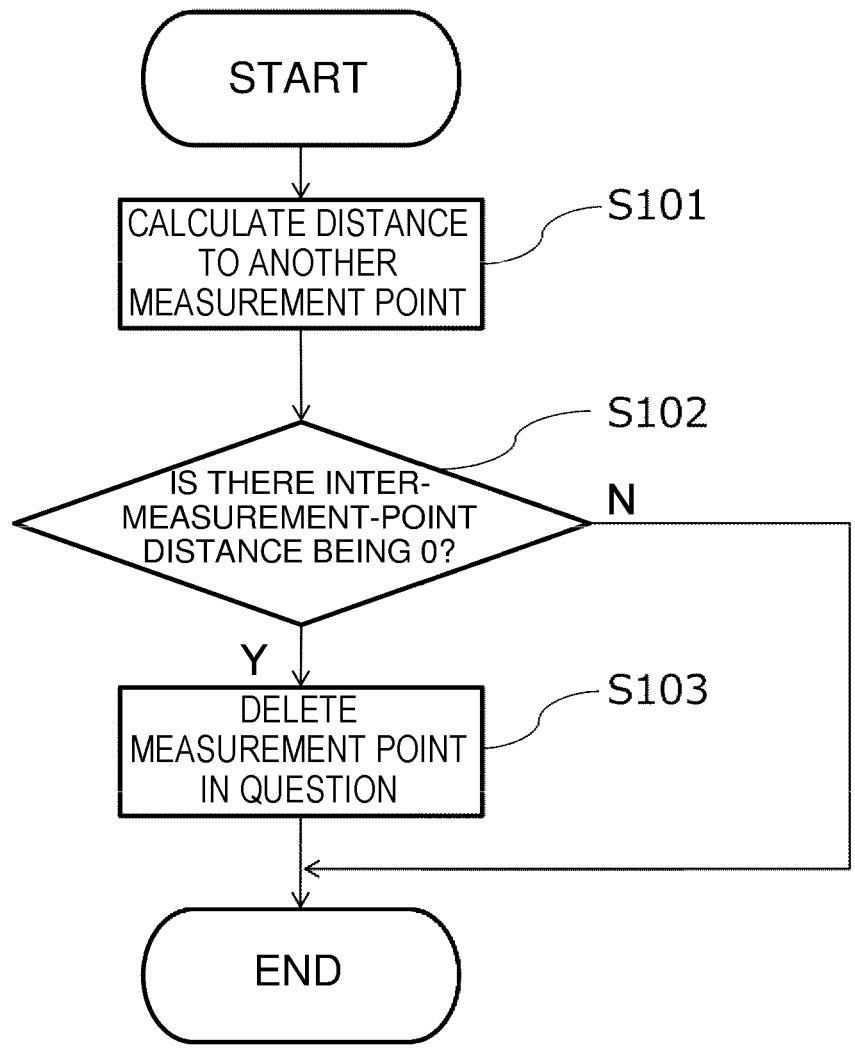
FIG. 15 is a flowchart illustrating processes through which an overlapping measurement-point integrating section included in the coordinate appropriateness determining section integrates overlapping measurement points.

As illustrated in FIG. 15, the overlapping measurement-point integrating section 251 first calculates distances between measurement points on a horizontal plane or in a three-dimensional space (S101). The overlapping measurement-point integrating section 251 checks for any inter-measurement-point distance being 0 (S102), and in a case where there is a measurement point that makes an inter-measurement-point distance 0, the overlapping measurement-point integrating section 251 excludes such a measurement point (S103).

Flowchart Illustrating Details of Step S200 Executed by the Very-Near Measurement-Point Integrating Section 252

Figure 16:
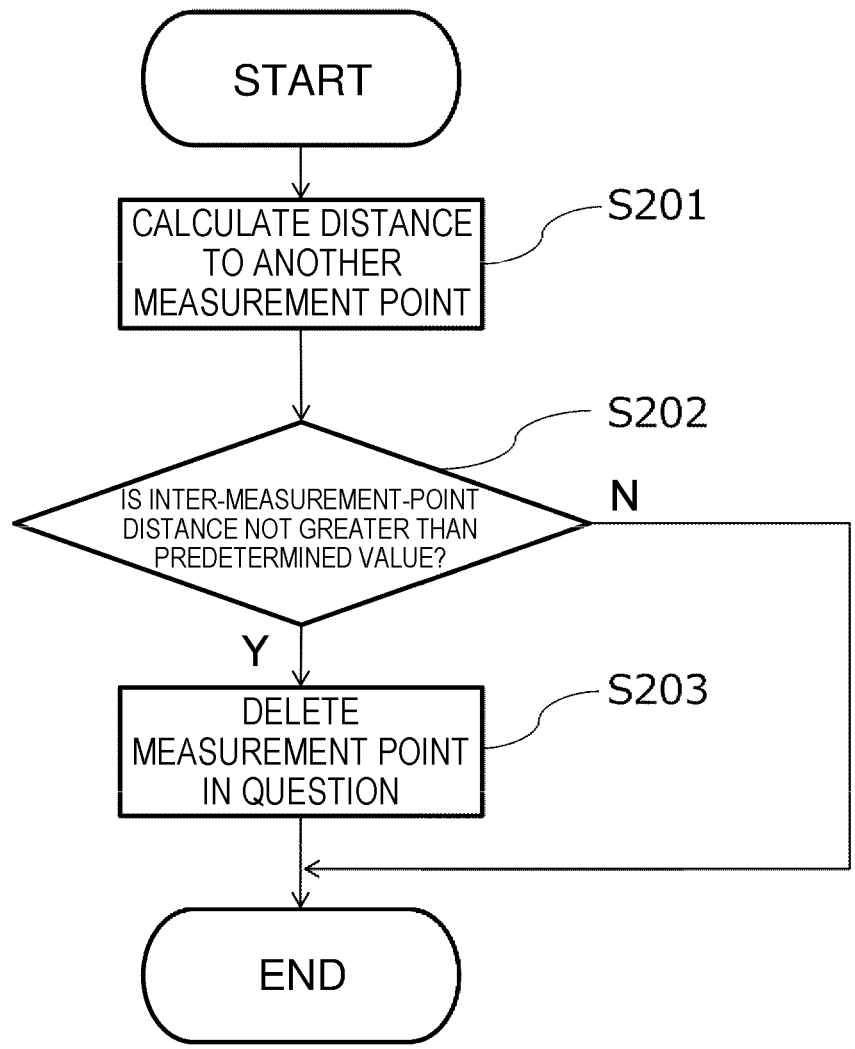
FIG. 16 is a flowchart illustrating processes through which a very-near measurement-point integrating section included in the coordinate appropriateness determining section integrates measurement points close to one another.

As illustrated in FIG. 16, the very-near measurement-point integrating section 252 first calculates distances between measurement points on a horizontal plane or in a three-dimensional space (S201). Note that, in place of the process in which the very-near measurement-point integrating section 252 calculates the distances, a result of step S101 executed by the overlapping measurement-point integrating section 251 may be acquired. The very-near measurement-point integrating section 252 checks for any inter-measurement-point distance being not greater than a predetermined value (S202), and in a case where there is a measurement point that makes an inter-measurement-point distance not greater than the predetermined value, the very-near measurement-point integrating section 252 excludes such a measurement point (S203).

Flowchart Illustrating Details of Step S300 Executed by the Altitude Abnormality Checking Section 253

Figure 17:
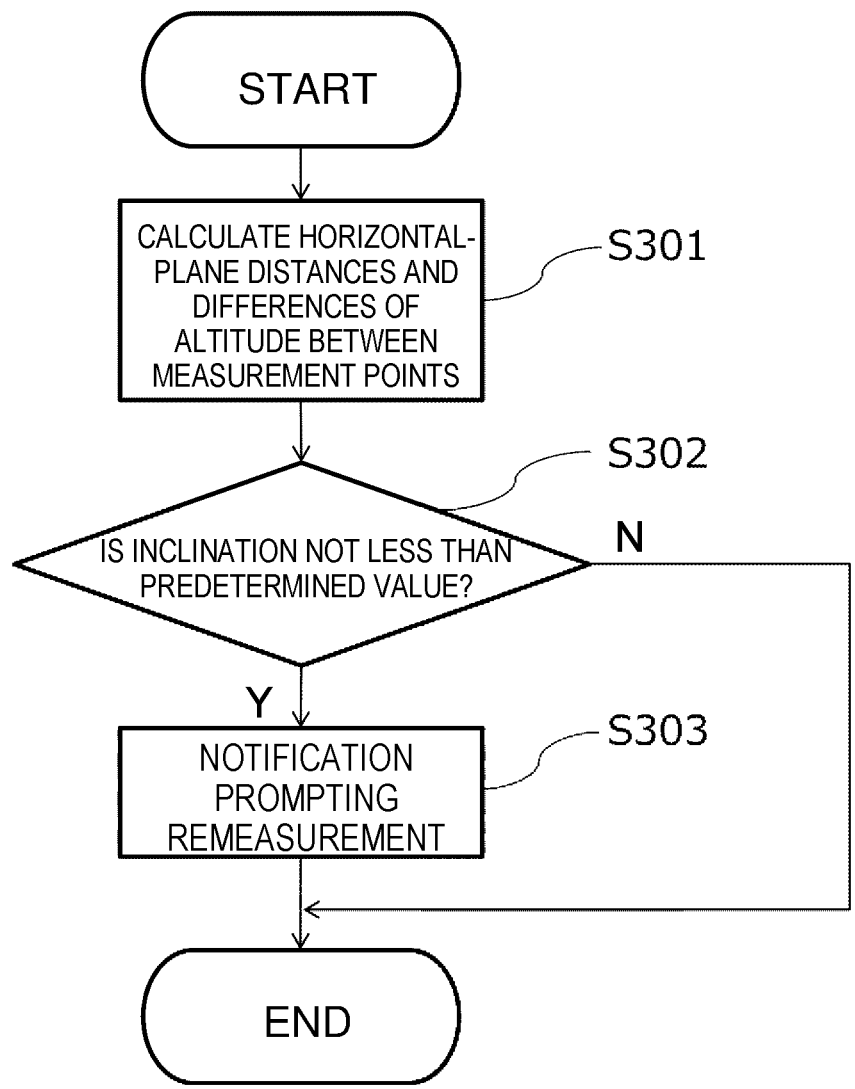
FIG. 17 is a flowchart illustrating processes through which an altitude abnormality checking section included in the coordinate appropriateness determining section extracts a measurement point of which an altitude coordinate is abnormal and issues an alarm.

As illustrated in FIG. 17, the altitude abnormality checking section 253 first calculates distances between measurement points in the three-dimensional directions (S301). Note that, in place of the process in which the altitude abnormality checking section 253 calculates the distances, results of step S100 executed by the overlapping measurement-point integrating section 251 and step S200 executed by the very-near measurement-point integrating section 252 may be acquired.

The altitude abnormality checking section 253 determines, out of inter-measurement-point distances, a distance on the X-Y plane, that is, the horizontal plane and a distance in a Z-axis direction, that is, the height direction, to calculate an inclination of a straight line passing through the two measurement points in question. In a case where the inclination is not less than a predetermined value (S302), the altitude abnormality checking section 253 notifies a user of being promoted to perform remeasurement (S303). In a case where the inclination is less than the predetermined value, the altitude abnormality checking section 253 leaves the measurement points as possible endpoints of a movable area.

Note that, instead of promoting the user to perform remeasurement, the altitude abnormality checking section 253 may refer to a height-direction coordinate of a measurement point that overlaps or is close to the measurement point having an inclination not less than the predetermined value on a horizontal plane, and in a case where the height-direction coordinate is within a normal range, the altitude abnormality checking section 253 may determine the measurement point having the height-direction coordinate as a possible endpoint of the movable area.

Flowchart Illustrating Details of Step S400 Executed by the Measurement Order Checking Section 254

Figure 18:
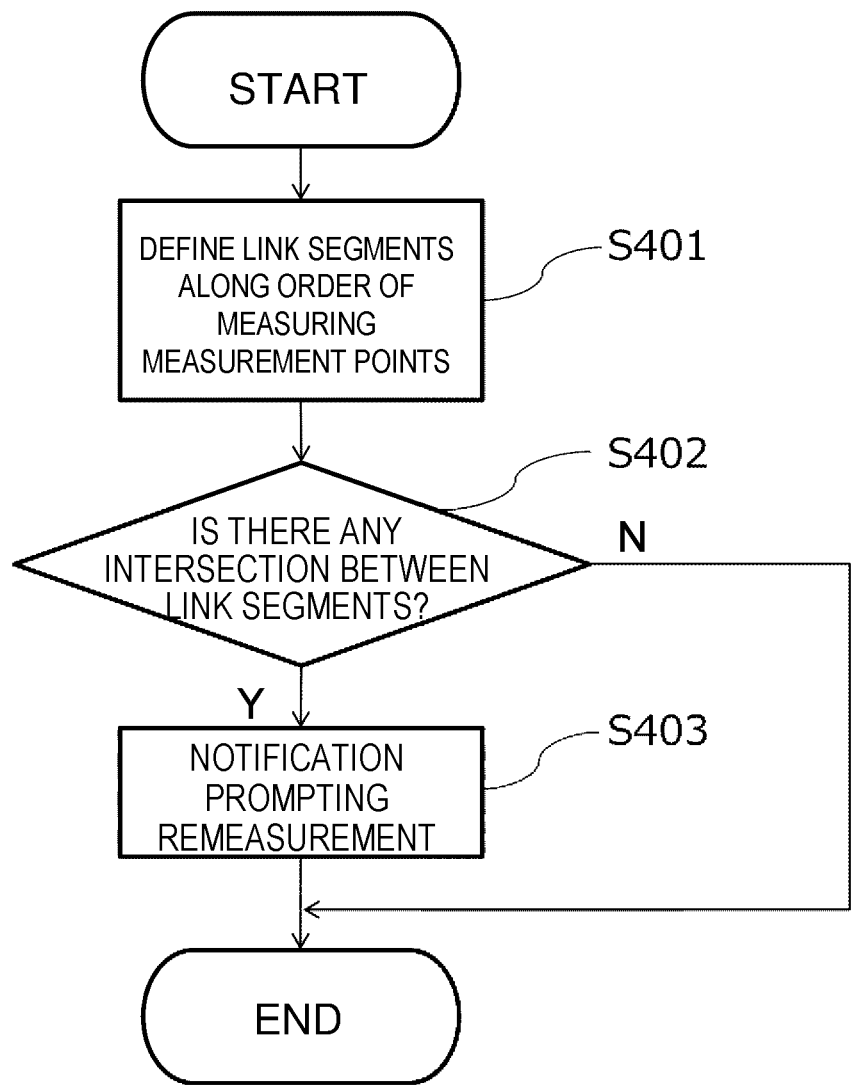
FIG. 18 is a flowchart illustrating processes through which a measurement order checking section included in the coordinate appropriateness determining section checks whether measurement-point coordinates are acquired in an order of neighborhood in a circumferential direction and issues an alarm in a case where the measurement-point coordinates are not acquired in the order of neighborhood.

As illustrated in FIG. 18, the measurement order checking section 254 first defines link segments that link measurement points acquired by the coordinate measuring device 2 in an order of measurement (S401). The measurement order checking section 254 next determines whether there is any intersection between the link segments (S402). In this determination, the measurement order checking section 254 may determine whether there is any solution of simultaneous equations by calculation based on equations of lines passing sets of coordinates or may sequentially substitute values into the equations of the line passing the sets of coordinates to search for a set of coordinates that satisfies two of the equations.

In a case where there is an intersection between link segments, the measurement order checking section 254 notifies a user of being promoted to perform remeasurement (S403). In a case where there is no intersection between link segments, the measurement order checking section 254 leaves the measurement points as possible endpoints of the movable area.

Flowchart Illustrating Details of Step S500 Executed by the Polygon Approximation Processing Section 255

Figure 19:
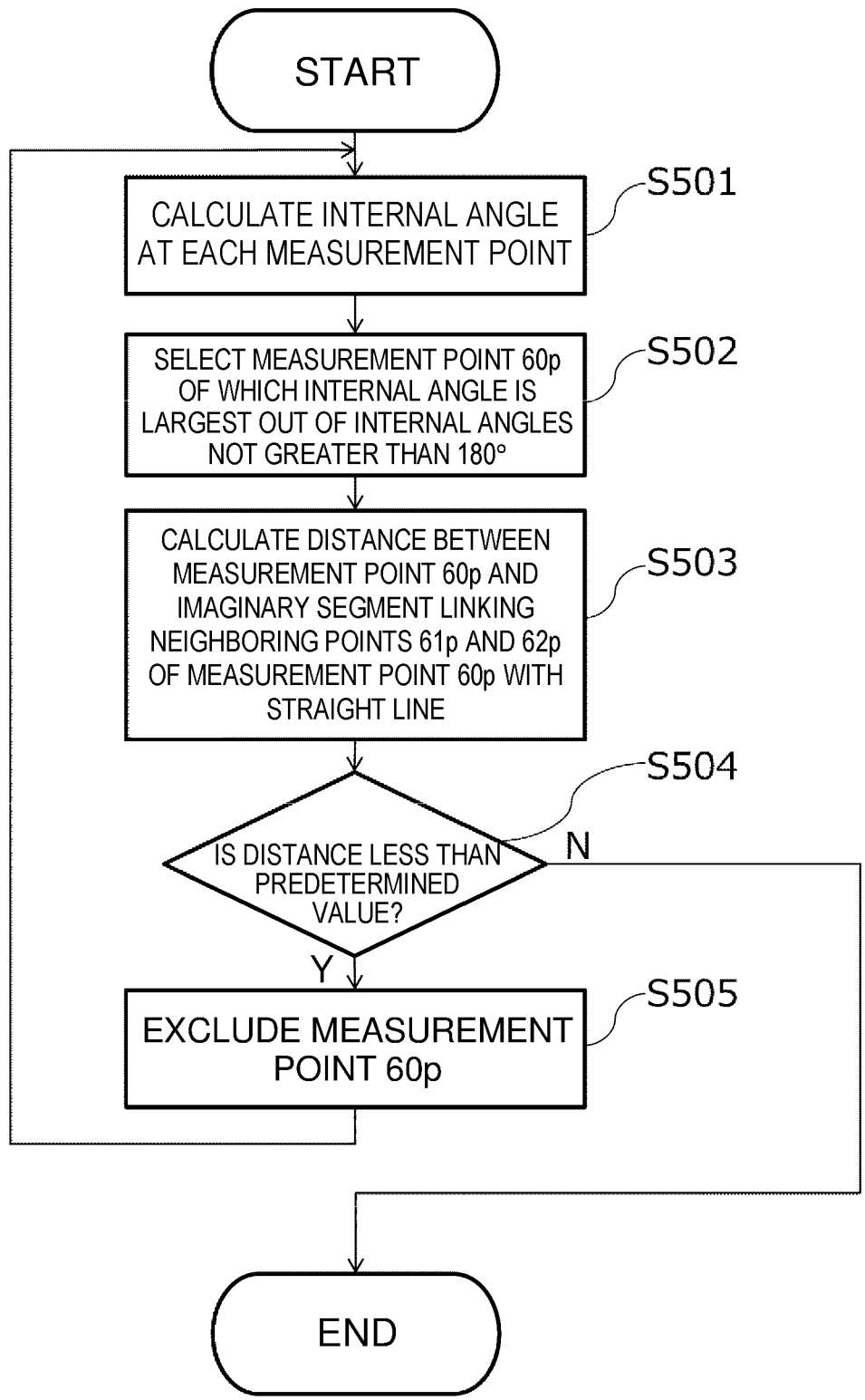
FIG. 19 is a flowchart illustrating processes through which a polygon approximation processing section included in the coordinate appropriateness determining section performs a polygonal approximation process on an internal angle not greater than 180°.

As illustrated in FIG. 19, the polygon approximation processing section 255 performs the following processing on measurement points one by one to perform approximation processing on measurement points having internal angles being less than 180°. In the following description, the case where the movable area 70i is generated in the agricultural field 70 illustrated in FIG. 11 will be taken as an example when necessary.

The polygon approximation processing section 255 first calculates internal angles at the measurement points (S501). The polygon approximation processing section 255 next selects the measurement point 60p, which has a largest internal angle not greater than 180° out of the calculated internal angles (S502).

Next, the polygon approximation processing section 255 calculates a distance between the measurement point 60p and the imaginary segment 60s, which is a straight line linking the measurement points 61p and 62p both neighboring the measurement point 60p in the circumferential direction (S503). In a case where the distance between the measurement point 60p and the imaginary segment 60s is less than a predetermined value (S504), the polygon approximation processing section 255 excludes the measurement point 60p from sets of endpoint coordinates of the movable area 70i (S505). Referring back to a process of step S501, for each of the measurement points after the exclusion, the polygon approximation processing section 255 next determines necessity of the exclusion again. The necessity of the exclusion is to be determined again for each of the measurement points after the exclusion because, for example, an internal angle at the measurement point 62p changes by excluding the measurement point 60p.

In step S504, in a case where the distance between the measurement point 60p and the imaginary segment 60s is not less than the predetermined value, the polygon approximation processing section 255 leaves the measurement points as possible endpoints of the movable area 70i.

Figure 20:
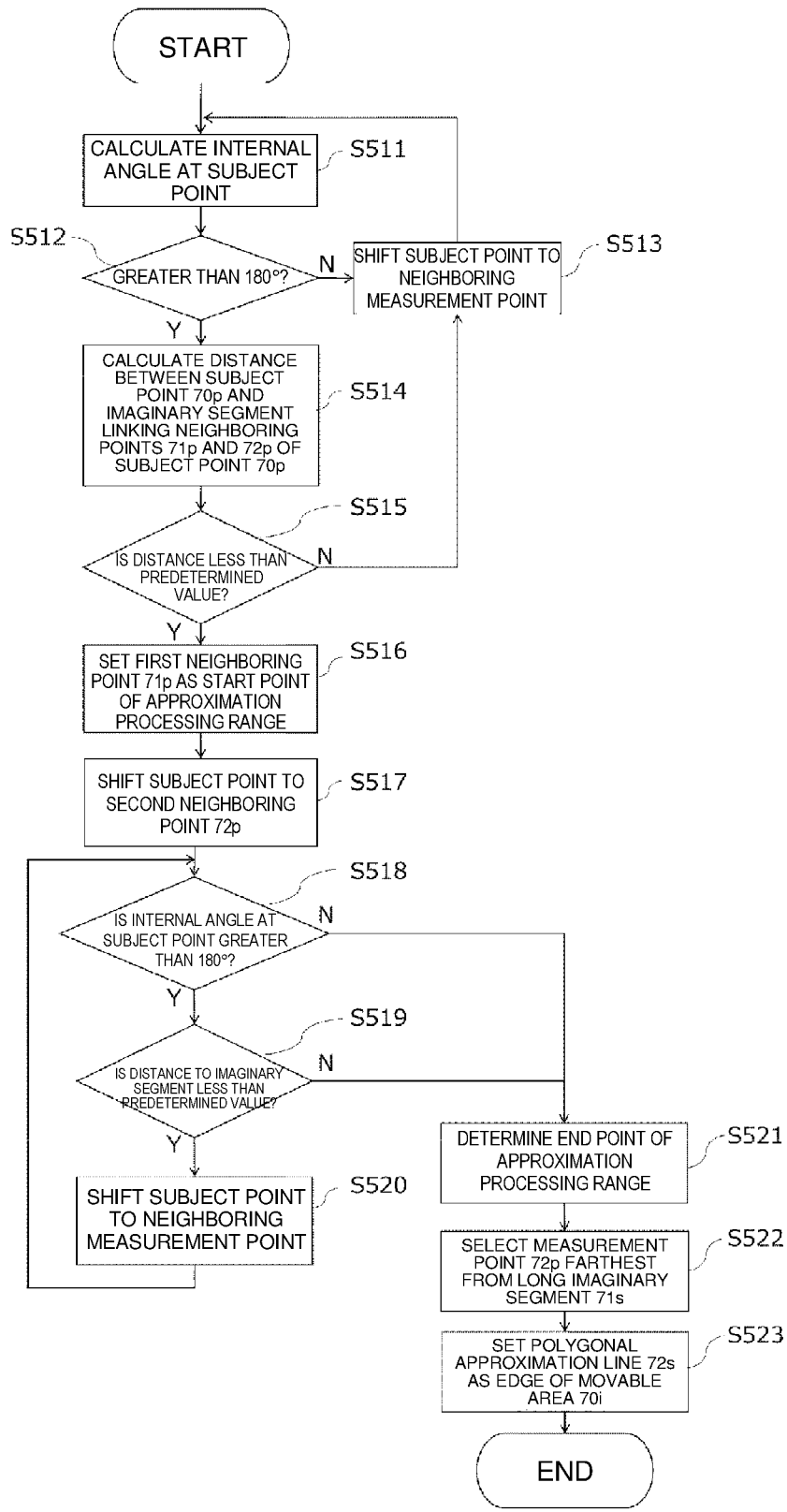
FIG. 20 is a flowchart illustrating processes through which the polygon approximation processing section performs a polygonal approximation process on an internal angle greater than 180°.

As illustrated in FIG. 20, the polygon approximation processing section 255 performs the following processing on measurement points one by one to perform approximation processing on measurement points having internal angles being greater than 180°. In the following description, a measurement point to be subjected to a process of a step will be referred to as a subject point. The case where the movable area 70i is generated in the agricultural field 70 illustrated in FIG. 12 will be taken as an example when necessary.

The polygon approximation processing section 255 first calculates an internal angle at a subject point (S511). In a case where the internal angle at the subject point is not greater than 180° (S512), the polygon approximation processing section 255 shifts the subject point to a measurement point neighboring the subject point in the circumferential direction (S513) and returns the processing to step S511. In a case where internal angles of all the measurement points are not greater than 180°, the polygon approximation processing section 255 finishes the processing. In the first processing, the internal angle of the subject point is preferably not greater than 180°. If a measuring point at which an internal angle is greater than 180° is set as the subject point in the first processing, in a case where the subject point is a point in a middle of the approximation processing range, it is difficult to calculate a start point and an end point of the approximation processing range accurately in processing to be described later.

In a case where the internal angle at the subject point is greater than 180° (S512), the polygon approximation processing section 255 calculates a distance between a target point 70p and the imaginary segment 70s linking the first neighboring point 71p and the second neighboring point 72p, which are measurement points both neighboring the target point 70p in the circumferential direction (S514). In a case where the distance is not less than the predetermined value (S515), the polygon approximation processing section 255 proceeds the processing to step S513 to shift the subject point to a neighboring measurement point and returns the processing to step S511 to calculate an internal angle at the subject point. In a case where distances to imaginary segments are less than the predetermined value at all of the measurement points, the polygon approximation processing section 255 finishes the processing.

In step S515, in a case where the distance between the imaginary segment 70s and the target point 70p is less than the predetermined value, the polygon approximation processing section 255 sets the first neighboring point 71p as an approximation processing target point and as a start point of the approximation processing range.

The polygon approximation processing section 255 shifts the subject point to the second neighboring point 72p (S517). That is, the polygon approximation processing section 255 calculates an internal angle at the second neighboring point 72p and determines whether the internal angle is greater than 180° (S518). In a case where the internal angle at the second neighboring point 72p is greater than 180°, the polygon approximation processing section 255 determines whether a distance between the subject point and an imaginary segment that links measurement points neighboring the subject point in the circumferential direction (S519). In a case where the distance between the imaginary segment and the subject point is less than the predetermined value, the polygon approximation processing section 255 determines the subject point as an approximation processing target point, shifts the subject point to a measurement point neighboring the second neighboring point 72p in the circumferential direction, that is, the third neighboring point 73p in the example illustrated in FIG. 12, and returns the processing to step S518.

In steps S518 to S519, in a case where the internal angle at the subject point is not greater than 180° or in a case where the distance between the imaginary segment and the subject point is not less than the predetermined value, the polygon approximation processing section 255 determines the subject point as the end point of the approximation processing range (S521). In the example illustrated in FIG. 12, the end point of the approximation processing range is the measurement point 74p.

The polygon approximation processing section 255 next defines the long imaginary segment 71s that links the start point and the end point of the approximation processing range, that is, the first neighboring point 71p and the measurement point 74p and selects a measurement point farthest from the long imaginary segment 71s (S522). In the example illustrated in FIG. 12, the measurement point farthest from the long imaginary segment 71s is the second neighboring point 72p.

The polygon approximation processing section 255 determines the polygonal approximation line 72s, which passes through the second neighboring point 72p and is parallel to the long imaginary segment 71s, as a new edge of the movable area 70*i* (S523). In other words, the polygon approximation processing section 255 determines the intersections 721*p* and 722*p* between the long imaginary segment 71*s* and link segments that link the measurement points in the circumferential direction as new endpoints of the movable area 70*i*.

As seen from the above, the configuration in which the polygon approximation processing section 255 checks measurement points one by one and approximates the approximation processing range collectively makes it possible to exclude with efficiency an area where it is difficult for the drone 100 to fly safely.

This configuration makes it possible to generate a traveling route that allows an efficient movement and maintains a high safety even in autonomous operation.

Although the present description has been made about a drone for spreading an agricultural chemical agent as an example, note that a technical concept of the present invention is not limited to this example and is applicable generally to machinery that operates autonomously. The technical concept is also applicable to drones other than those for agriculture that perform autonomous flight. In addition, the technical concept is also applicable to self-propelled machinery that runs on the ground and operates autonomously.

(Technically Advantageous Effects of the Invention of the Present Application)

The traveling route generating system according to the present invention generates a traveling route that allows an efficient movement and maintains a high safety even in autonomous operation.

The invention claimed is:

1. A traveling route generating system for generating a traveling route for an aerial vehicle in a target area, the traveling route generating system including a base station and comprising:
  a computer, which when executing a program, configures the computer to:
  acquire a plurality of sets of measurement-point coordinates on edges of the target area; and
  determine an appropriateness of the plurality of sets of measurement-point coordinates, in a case where any of the plurality of sets of measurement-point coordinates is determined to be inappropriate by the determination, not generate a movable area where the aerial vehicle can move or not use a set of measurement-point coordinates determined to be inappropriate for generating the movable area or notify a user by a user interface device, and in a case where the plurality of sets of measurement-point coordinates are determined to be appropriate by the determination, generate the movable area based on the plurality of sets of measurement-point coordinates, wherein
  the acquired measurement-point coordinates are three-dimensional coordinates, and
  the computer is further configured to:
  in a case where there is a set of measurement-point coordinates that makes an inclination of a straight line passing through two measurement points of the plurality of sets of measurement-point coordinates with respect to a horizontal plane that is greater than or equal to a predetermined value, determine that the set of measurement-point coordinates in question is inappropriate; and
  in the case where the plurality of sets of measurement-point coordinates are determined to be appropriate, generate the traveling route.

2. The traveling route generating system according to claim 1, wherein in a case where the any of the plurality of sets of measurement-point coordinates is determined to be inappropriate by the determination, the computer is further configured to use a user interface device to notify a user of information on the set of measurement-point coordinates determined to be inappropriate.

3. The traveling route generating system according to claim 1, wherein the computer is further configured to, in a case where there is a measurement point that is so close to a plurality of measurement points that distances between the measurement point and the plurality of measurement points are within a predetermined range on a horizontal plane or in a three-dimensional space, integrate the plurality of measurement points into one.

4. The traveling route generating system according to claim 3, wherein in a case where there is a measurement point that is so close to a plurality of measurement points that distances between the measurement point and the plurality of measurement points are within a predetermined range on a horizontal plane or in a three-dimensional space, the computer is further configured to exclude one or some of the plurality of measurement points close to one another to generate the movable area.

5. The traveling route generating system according to claim 3, wherein in a case where there is a measurement point that is so close to a plurality of measurement points that distances between the measurement point and the plurality of measurement points are within a predetermined range on a horizontal plane or in a three-dimensional space, the computer is further configured to determine coordinates being average values of the plurality of sets of measurement-point coordinates close to one another as an integrated measurement point coordinates and generate the movable area based on the integrated measurement point and other measurement points.

6. The traveling route generating system according to claim 1, wherein the computer is further configured to approximate a shape of a polygon of which endpoints are the plurality of measurement points to a polygon of which vertices are smaller in number than those of the polygon of which endpoints are the plurality of measurement points and determines the approximated polygon as the movable area.

7. The traveling route generating system according to claim 6, wherein the computer is further configured to, in a case where a distance between an imaginary segment and any measurement point of the measurement points is less than a predetermined value, the imaginary segment linking first neighboring measurement-point and a second neighboring measurement point, the first neighboring measurement-point coordinates neighboring the any measurement-point in a circumferential direction, and the second neighboring measurement point neighboring the any measurement point in a direction opposite to the circumferential direction, exclude the any measurement point from sets of endpoint coordinates of the movable area.

8. A drone that flies within the movable area generated by the traveling route generating system according to claim 1.

9. The drone according to claim 8, wherein the drone is connected to the traveling route generating system over a network and is configured to receive a traveling route generated in the movable area by the traveling route generating system and flying along the traveling route.

10. A traveling route generating system for generating a traveling route for an aerial vehicle in a target area, the traveling route generating system comprising:

a computer, which when executing a program, configures the computer to:

acquire a plurality of sets of measurement-point coordinates on edges of the target area;

determine an appropriateness of the plurality of sets of measurement-point coordinates, in a case where any of the plurality of sets of measurement-point coordinates is determined to be inappropriate by the determination, not generate a movable area where the aerial vehicle can move or does not use a set of measurement-point coordinates determined to be inappropriate for generating the movable area or notify a user by a user interface device, and in a case where the plurality of sets of measurement-point coordinates are determined to be appropriate by the determination, generate the movable area based on the plurality of sets of measurement-point coordinates;

determine whether the plurality of sets of measurement-point coordinates are acquired in an order of neighborhood in a circumferential direction; and in the case where the plurality of sets of measurement-point coordinates are determined to be appropriate, generate the traveling route.

11. The traveling route generating system according to claim 10, wherein the computer is further configured to define imaginary link segments that link the plurality of sets of measurement-point coordinates in an order of acquisition, check for a presence or absence of an intersection at which some of the plurality of imaginary link segments intersect with each other on a horizontal plane, and determine, based on the presence or absence of the intersection, whether the plurality of sets of measurement-point coordinates are acquired in the order of neighborhood in the circumferential direction.

12. A drone that flies within the movable area generated by the traveling route generating system according to claim 10.

13. A traveling route generating system for generating a traveling route for an aerial vehicle in a target area, the traveling route generating system comprising:

a computer, which when executing a program, configures the computer to:

acquire a plurality of sets of measurement-point coordinates on edges of the target area;

determine an appropriateness of the plurality of sets of measurement-point coordinates, in a case where any of the plurality of sets of measurement-point coordinates is determined to be inappropriate by the determination, not generate a movable area where the aerial vehicle can move or not use a set of measurement-point coordinates determined to be inappropriate for generating the movable area or notify a user by a user interface device, and in a case where the plurality of sets of measurement-point coordinates are determined to be appropriate by the determination, generate the movable area based on the plurality of sets of measurement-point coordinates;

approximate a shape of a polygon of which endpoints are the plurality of measurement points to a polygon of which vertices are smaller in number than those of the polygon of which endpoints are the plurality of measurement points and determines the approximated polygon as the movable area;

in a case where a distance between an imaginary segment and any measurement point of the measurement points is less than a predetermined value, the imaginary segment linking a first neighboring measurement-point and a second neighboring measurement point, the first neighboring measurement-point coordinates neighboring the any measurement-point in a circumferential direction, and the second neighboring measurement point neighboring the any measurement point in a direction opposite to the circumferential direction, exclude the any measurement point from sets of endpoint coordinates of the movable area; and in a case where an angle formed by an imaginary segment linking the first neighboring measurement point and the any measurement point and an imaginary segment linking the second neighboring measurement point and the measurement point is greater than 180°, and in a case where, at the any measurement point, the distance between the imaginary segment linking the first neighboring measurement point and the second neighboring measurement point, and the any measurement point is less than a predetermined value, determine the any measurement point as an approximation processing target point, defines a polygonal approximation line that passes through the any measurement point and is parallel to the imaginary segment linking the first neighboring measurement point and the second neighboring measurement point, and set intersections between the polygonal approximation line and the link segments linking the plurality of sets of measurement-point coordinates as endpoint coordinates of the movable area; and in the case where the plurality of sets of measurement-point coordinates are determined to be appropriate, generate the traveling route.

14. The traveling route generating system according to claim 13, wherein computer is further configured to:

in a case where one of the approximation processing target point is determined, sequentially determine whether a third neighboring measurement point is an approximation processing target point, the third neighboring measurement point further neighboring the first neighboring measurement point or the second neighboring measurement point in the circumferential direction, to determine one or more continuous approximation processing target points, and define a polygonal approximation line that passes through one of the one or more approximation processing target points farthest from a long imaginary segment and is parallel to the long imaginary segment, the long imaginary segment linking points that neighbor the one or more approximation processing target points and are different from the one or more approximation processing target points, and sets intersections between the polygonal approximation line and link segments linking the plurality of measurement-point coordinates as endpoint coordinates of the movable area.

15. A drone that flies within the movable area generated by the traveling route generating system according to claim 13.

16. A coordinate measuring system that includes a base station and a coordinate measuring device, wherein the coordinate measuring device comprises:

a computer, which when executing a program memory, configures the computer to:

acquire sets of measurement-point coordinates on edges of a target area based on a signal from the base station;

determine an appropriateness of the sets of measurement-point coordinates, in a case where any of the plurality of sets of measurement-point coordinates is determined to be inappropriate by the determination, not generate a movable area where the aerial vehicle can move or not use a set of measurement-point coordinates determined to be inappropriate for generating the movable area or notify a user by a user interface device, and in a case where the plurality of sets of measurement-point coordinates are determined to be appropriate by the determination, generate the movable area based on the plurality of sets of measurement-point coordinates, wherein the acquired measurement-point coordinates are three-dimensional coordinates, and the computer is further configured to, in a case where there is a set of measurement-point coordinates that makes an inclination of a straight line passing through two measurement points of the plurality of sets of measurement-point coordinates with respect to a horizontal plane that is greater than or equal to a predetermined value, determine that the set of measurement-point coordinates in question is inappropriate.

17. A traveling route generating method for generating a traveling route for an aerial vehicle in a target area, the traveling route generating method comprising:

a step of acquiring sets of measurement-point coordinates on edges of the target area; and a step of determining appropriateness of the sets of measurement-point coordinates, in a case where any of the plurality of sets of measurement-point coordinates is determined to be inappropriate by the determination, not generating a movable area where the aerial vehicle can move or does not use a set of measurement-point coordinates determined to be inappropriate for generating the movable area or notify a user by a user interface device, and in a case where the plurality of sets of measurement-point coordinates are determined to be appropriate by the determination, generating the movable area based on the plurality of sets of measurement-point coordinates, wherein the acquired measurement-point coordinates are three-dimensional coordinates, and the traveling route generating method further comprising:

a step of, in a case where there is a set of measurement-point coordinates that makes an inclination of a straight line passing through two measurement points of the plurality of sets of measurement-point coordinates with respect to a horizontal plane that is greater than or equal to a predetermined value, determining that the set of measurement-point coordinates in question is inappropriate; and a step of, in the case where the plurality of sets of measurement-point coordinates are determined to be appropriate, generating the traveling route.

18. A coordinate measuring system that includes a base station and a coordinate measuring device, wherein the coordinate measuring device comprises:

a computer, which when executing a program memory, configures the computer to:

acquire sets of measurement-point coordinates on edges of a target area based on a signal from the base station;

determine an appropriateness of the sets of measurement-point coordinates, in a case where any of the plurality of sets of measurement-point coordinates is determined to be inappropriate by the determination, not generate a movable area where an aerial vehicle can move or not use a set of measurement-point coordinates determined to be inappropriate for generating the movable area or notify a user by a user interface device, and in a case where the plurality of sets of measurement-point coordinates are determined to be appropriate by the determination, generate the movable area based on the plurality of sets of measurement-point coordinates; and determine whether the plurality of sets of measurement-point coordinates are acquired in an order of neighborhood in a circumferential direction.

19. A coordinate measuring system that includes a base station and a coordinate measuring device, wherein the coordinate measuring device comprises:

a computer, which when executing a program memory, configures the computer to:

acquire sets of measurement-point coordinates on edges of a target area based on a signal from the base station;

determine an appropriateness of the sets of measurement-point coordinates, in a case where any of the plurality of sets of measurement-point coordinates is determined to be inappropriate by the determination, not generate a movable area where an aerial vehicle can move or not use a set of measurement-point coordinates determined to be inappropriate for generating the movable area or notify a user by a user interface device, and in a case where the plurality of sets of measurement-point coordinates are determined to be appropriate by the determination, generate the movable area based on the plurality of sets of measurement-point coordinates;

approximate a shape of a polygon of which endpoints are the plurality of measurement points to a polygon of which vertices are smaller in number than those of the polygon of which endpoints are the plurality of measurement points and determines the approximated polygon as the movable area;

in a case where a distance between an imaginary segment and any measurement point of the measurement points is less than a predetermined value, the imaginary segment linking a first neighboring measurement-point and a second neighboring measurement point, the first neighboring measurement-point coordinates neighboring the any measurement-point in a circumferential direction, and the second neighboring measurement point neighboring the any measurement point in a direction opposite to the circumferential direction, exclude the any measurement point from sets of endpoint coordinates of the movable area; and in a case where an angle formed by an imaginary segment linking the first neighboring measurement point and the any measurement point and an imaginary segment linking the second neighboring measurement point and the measurement point is greater than 180°, and in a case where, at the any measurement point, the distance between the imaginary segment linking the first neighboring measurement point and the second neighboring measurement point, and the any measurement point is less than a predetermined value, determine the any measurement point as an approximation processing target point, defines a polygonal approximation line that passes through the any measurement point and is parallel to the imaginary segment linking the first neighboring measurement point and the second neighboring measurement point, and set intersections between the polygonal approximation line and the link segments linking the plurality of sets of measurement-point coordinates as endpoint coordinates of the movable area.

20. In a traveling route generating system including a base station, a traveling route generating method for generating a traveling route for an aerial vehicle in a target area, the traveling route generating method comprising:
- a step of acquiring sets of measurement-point coordinates on edges of the target area;
- a step of determining appropriateness of the sets of measurement-point coordinates, in a case where any of the plurality of sets of measurement-point coordinates is determined to be inappropriate by the determination, not generating a movable area where the aerial vehicle can move or does not use a set of measurement-point coordinates determined to be inappropriate for generating the movable area or notify a user by a user interface device, and in a case where the plurality of sets of measurement-point coordinates are determined to be appropriate by the determination, generating the movable area based on the plurality of sets of measurement-point coordinates; and
- a step of determining whether the plurality of sets of measurement-point coordinates are acquired in an order of neighborhood in a circumferential direction; and
- a step of, in the case where the plurality of sets of measurement-point coordinates are determined to be appropriate, generating the traveling route.

21. In a traveling route generating system including a base station, a traveling route generating method for generating a traveling route for an aerial vehicle in a target area, the traveling route generating method comprising:
- a step of acquiring sets of measurement-point coordinates on edges of the target area;
- a step of determining appropriateness of the sets of measurement-point coordinates, in a case where any of the plurality of sets of measurement-point coordinates is determined to be inappropriate by the determination, not generating a movable area where the aerial vehicle can move or not use a set of measurement-point coordinates determined to be inappropriate for generating the movable area or notify a user by a user interface device, and in a case where the plurality of sets of measurement-point coordinates are determined to be appropriate by the determination, generating the movable area based on the plurality of sets of measurement-point coordinates;
- a step of approximating a shape of a polygon of which endpoints are the plurality of measurement points to a polygon of which vertices are smaller in number than those of the polygon of which endpoints are the plurality of measurement points and determines the approximated polygon as the movable area;
- a step of, in a case where a distance between an imaginary segment and any measurement point of the measurement points is less than a predetermined value, the imaginary segment linking a first neighboring measurement-point and a second neighboring measurement point, the first neighboring measurement-point coordinates neighboring the any measurement-point in a circumferential direction, and the second neighboring measurement point neighboring the any measurement point in a direction opposite to the circumferential direction, excluding the any measurement point from sets of endpoint coordinates of the movable area;
- a step of, in a case where an angle formed by an imaginary segment linking the first neighboring measurement point and the any measurement point and an imaginary segment linking the second neighboring measurement point and the measurement point is greater than 180°, and in a case where, at the any measurement point, the distance between the imaginary segment linking the first neighboring measurement point and the second neighboring measurement point, and the any measurement point is less than a predetermined value, determining the any measurement point as an approximation processing target point, defines a polygonal approximation line that passes through the any measurement point and is parallel to the imaginary segment linking the first neighboring measurement point and the second neighboring measurement point, and setting intersections between the polygonal approximation line and the link segments linking the plurality of sets of measurement-point coordinates as endpoint coordinates of the movable area; and
- a step of, in the case where the plurality of sets of measurement-point coordinates are determined to be appropriate, generating the traveling route.

* * * * *